(12) United States Patent
Kanai et al.

(10) Patent No.: US 8,734,295 B2
(45) Date of Patent: May 27, 2014

(54) VEHICULAR SHIFT CONTROL APPARATUS

(75) Inventors: Osamu Kanai, Toyota (JP); Takahiko Tsutsumi, Toyota (JP); Ichiro Kitaori, Nagoya (JP); Toshinari Suzuki, Aichi (JP); Hiroatsu Endo, Nagoya (JP); Koki Ueno, Toyota (JP); Keisuke Sekiya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 101 days.

(21) Appl. No.: 13/585,054

(22) Filed: Aug. 14, 2012

(65) Prior Publication Data

US 2012/0309590 A1    Dec. 6, 2012

Related U.S. Application Data

(63) Continuation-in-part of application No. PCT/JP2010/052472, filed on Feb. 18, 2010.

(51) Int. Cl.
*B60K 26/00* (2006.01)
*B60K 26/02* (2006.01)
*B60K 31/00* (2006.01)

(52) U.S. Cl.
USPC ............................ 477/190; 477/183; 477/906

(58) Field of Classification Search
USPC ............... 477/906, 183, 189, 190; 74/473.21, 74/473.24, 473 R
See application file for complete search history.

(56) References Cited

U.S. PATENT DOCUMENTS

| | | | | |
|---|---|---|---|---|
| 2012/0010793 | A1* | 1/2012 | Ueno et al. | 701/58 |
| 2012/0016559 | A1* | 1/2012 | Ueno et al. | 701/55 |
| 2012/0257453 | A1* | 10/2012 | Shiino et al. | 365/185.18 |

FOREIGN PATENT DOCUMENTS

| | | |
|---|---|---|
| JP | 3-219165 | 9/1991 |
| JP | 6-1157 | 1/1994 |
| JP | 2002-349701 | 12/2002 |
| JP | 2003-34157 | 2/2003 |
| JP | 2006-336840 | 12/2006 |

OTHER PUBLICATIONS

International Search Report in International Application No. PCT/JP2010/052472; Mailing Date: May 25, 2010.

* cited by examiner

*Primary Examiner* — Justin Holmes
(74) *Attorney, Agent, or Firm* — Finnegan, Henderson, Farabow, Garrett & Dunner, LLP

(57) ABSTRACT

A vehicular shift control apparatus for a vehicle provided with a parking lock device selectively switched to a locking position in which rotation of wheels of the vehicle is prevented and a non-locking position in which the rotation of the wheels is not prevented, by an operation of an electrically operated actuator, the vehicular shift control apparatus being configured to perform a failure diagnosis to determine whether the actuator is operable or not, the vehicular shift control apparatus includes: the vehicular shift control apparatus permits the operation of the actuator if a supply voltage to the actuator is raised from a value lower than a predetermined threshold supply voltage value to a value not lower than the threshold supply voltage value after a determination that the actuator is inoperable is obtained in the failure diagnosis.

6 Claims, 9 Drawing Sheets

VEHICULAR SHIFT CONTROL APPARATUS

CROSS-REFERENCE TO RELATED APPLICATIONS

This application is a continuation-in-part of International Application No. PCT/JP2010/052472, filed Feb. 18, 2010, the content of which is incorporated herein by reference.

TECHNICAL FIELD

The present invention relates to a control performed to deal with a failure of a shift-by-wire system.

BACKGROUND ART

There is well known a vehicular shift control apparatus adopting a so-called "shift-by-wire (SBW) system configured to electrically change a shift position associated with a manner of running of a vehicle, by operating an electrically operated actuator such as an electric motor. Patent Document 1 discloses an example of a SBW control apparatus provided in a shift range switching device. This SBW control apparatus is configured such that in the event of power application to the SBW control apparatus after instantaneous power removal therefrom, a position of an output shaft (an angular position of the output shaft) of the above-described electrically operated actuator, which output shaft position is memorized before the instantaneous power removal and kept in memory after the power removal is recognized as the output shaft position after the power application, if the above-described actuator was not operated before the instantaneous power removal.

PRIOR ART DOCUMENT

Patent Documents

Patent Document 1: JP-2006-336840 A
Patent Document 2: JP-2003-034157 A

SUMMARY OF THE INVENTION

Object Achieved By The Invention

The vehicle may have a failure that disables the above-described electrically operated actuator to be operated, after the power application to the SBW control apparatus after the power removal therefrom, for instance. Possible causes for such a failure of the vehicle include a failure of the electrically operated actuator per se, and a drop of a supply voltage to the electrically operated actuator below a lower limit value above which the electrically operated actuator is operable.

If the above-described SBW control apparatus once determines that the above-described electrically operated actuator is inoperable after the power application, the above-described SBW control apparatus is usually configured to deem the electrically operated actuator to be inoperable since the determination and to perform a fail-safe control to prevent an operation of the electrically operated actuator. For example, the fail-safe control is performed to prevent a transition to a state in which the vehicle can be run.

Where the above-described electrically operated actuator is not operable due to a drop of the above-described supply voltage, namely, due to an excessively low value of the supply voltage, however, this supply voltage may be possibly raised to a value equal to or higher than the above-indicated lower limit value, enabling the actuator to be operated. In this case where the above-described electrically operated actuator becomes operable as a result of the rise of the supply voltage, it is adequate to recognize the electrically operated actuator to be operable and to cancel the fail-safe control and perform a normal control to be performed when the electrically operated actuator is normally operable. However, the SBW control apparatus is not configured to perform the normal control in the above-indicated case, but is configured to maintain the determination that the actuator is still inoperable. In this respect, it is noted that this problem is not recognized in the prior art.

The present invention was made in view of the background art described above. It is an object of this invention to provide a vehicular shift control apparatus configured to perform an adequate control processing with respect to the electrically operated actuator in consideration of a possibility that the actuator becomes operable after the actuator is once determined to be inoperable.

Means For Achieving The Object

The object indicated above is achieved according to the present invention, which provides a vehicular shift control apparatus for (a) a vehicle provided with a parking lock device selectively switched to a locking position in which rotation of wheels of the vehicle is prevented and a non-locking position in which the rotation of said wheels is not prevented, by an operation of an electrically operated actuator, the vehicular shift control apparatus being configured to perform a failure diagnosis to determine whether said actuator is operable or not, and (b) characterized in that the above-described vehicular shift control apparatus permits the operation of the above-described actuator if a supply voltage to the above-described actuator is raised from a value lower than a predetermined threshold supply voltage value to a value not lower than the threshold supply voltage value after a determination that the above-described actuator is inoperable is obtained in said failure diagnosis.

Advantages Of The Invention

If the supply voltage to the above-described electrically operated actuator is raised from the value lower than the above-indicated threshold supply voltage value to the value not lower than the threshold supply voltage value, the above-described actuator which was determined to be inoperable prior to this rise of the supply voltage is considered to become inoperable due to an excessive drop of the supply voltage. Further, the actuator is considered to be operable after the rise of the supply voltage. According to the present invention described above, therefore, an adequate control processing can be performed with respect to the actuator, in consideration of a possibility that the actuator becomes operable, more specifically, a possibility that the above-described supply voltage is raised to a sufficiently high value, after the previous determination that the actuator is inoperable. For example, the adequate control processing is a normal control of the actuator to be implemented where the actuator is normally operable on the premise that the actuator is operable. On the other hand, an inadequate control processing with respect to the actuator may be a control of the actuator to be implemented in the event of a failure of the above-described actuator, for instance, a control to inhibit an operation of the actuator, based on an incorrect recognition that the actuator is inoperable, while in fact the actuator is operable.

According to a preferred form of the present invention, the above-described threshold supply voltage value is a lower limit of the supply voltage to the above-described actuator. In this preferred form of the invention, it is possible to more adequately determine that the above-described actuator which was determined to be inoperable become inoperable due to an excessive drop of the above-described supply voltage.

According to another preferred form of the invention, the vehicular shift control apparatus performs the above-described failure diagnosis as a second failure diagnosis if the supply voltage to the above-described actuator is raised from the value lower than the above-described predetermined threshold supply voltage value to the value not lower than the threshold supply voltage value after the determination that the above-described actuator is inoperable is obtained in the first failure diagnosis, and permits the operation of the above-described actuator only if the determination that the above-described actuator is operable is obtained in the above-described second failure diagnosis. In this preferred form of the invention, it is possible to permit the operation of the actuator after it is confirmed that the actuator becomes operable as a result of the rise of the supply voltage to the above-described actuator.

According to a further preferred form of the invention, the vehicular shift control apparatus permits the operation of the above-described actuator under a condition that a predetermined manual operation has been performed by a vehicle passenger after a rise of the above-described supply voltage to the above-described actuator from the value lower than the above-described threshold supply voltage value to the value not lower than the threshold supply voltage value, if the rise of above-described supply voltage to the value not lower than threshold supply voltage value occurs after the determination that the above-described actuator is inoperable is obtained in the above-described failure diagnosis. In this preferred form of the invention, the above-described actuator is operated after the manual operation by the vehicle passenger, preventing a discomfort that would otherwise be felt by the vehicle passenger upon operation of the actuator while the vehicle passenger recognizes that the actuator is inoperable.

According to still another preferred form of the invention, the above-described predetermined manual operation by the vehicle passenger is an operation that enables the above-described vehicle to be ready for running. This preferred form of the invention has an advantage that the vehicle passenger is not required to perform a special operation to permit the operation of the above-described actuator, since the operation that enables the vehicle to be ready for running is an operation required to start running of the vehicle.

According to a further preferred form of the invention, (a) the vehicle shift control apparatus inhibits the operation of the above-described actuator if the determination that the above-described actuator is inoperable is obtained in the above-described failure diagnosis, and (b) the shift control apparatus cancels an inhibition of the operation of the above-described actuator, before permitting the operation of the actuator after the inhibition if above-described vehicle shift control apparatus permits after the operation of above-described actuator is inhibited. In this preferred form of the invention, it is possible to avoid commanding the above-described actuator to be operated when the actuator is inoperable. In addition, it is possible to avoid a complicated control of permitting and inhibiting the operation of the above-described actuator.

According to yet another preferred form of the invention, the above-described vehicle is provided with a vehicle drive power transmitting system in a power transmitting path between its vehicle drive power source and its drive wheels. Although the vehicle drive power source preferably includes a gasoline or diesel engine or any other internal combustion engine operable to generate a drive power by combustion of a fuel, but may use any other type of drive power source such as an electric motor or electric motors, alone, or in combination of the internal combustion engine. Namely, the above-described vehicle may be: an engine-drive vehicle using only an engine as the drive power source; an electric vehicle using only an electric motor or electric motors; a hybrid vehicle using both of an engine and an electric motor or electric motors; a vehicle using any drive power source other than the engine and electric motors; or a vehicle using three or more different types of drive power source.

According to a still further preferred form of the invention, the above-described vehicle drive power transmitting system is constituted, for example, by: a transmission alone; a torque converter and a transmission having a plurality of speed ratios; or this latter transmission, a speed reducing portion and a differential mechanism portion. For example, this transmission is constituted by: a speed reducing device such as a planetary gear set to which the above-described electric motor or motors is/are connected in the above-described electric vehicle; one of various types of planetary gear type automatic transmission having a plurality of gear positions (speed positions), for example, four, five, six or more forward drive speed positions, which are selectively established by selectively connecting rotary elements of a plurality of planetary gear sets through coupling devices; a synchronous meshing type parallel-two-axes automatic transmission having a plurality of pairs of permanently meshing shifting gears disposed on two axes, which are selectively brought into a power transmitting state by synchronizing devices which are operated by hydraulic actuators to automatically shift the automatic transmission; a so-called belt type continuously variable transmission which has a transmission belt functioning as a power transmitting member connecting a pair of variable-diameter pulleys effective diameters of which are variable to continuously change the speed ratio; a so-called traction type continuously variable transmission having a pair of cones rotatable about a common axis, and a plurality of rollers which are rotatable about respective axes intersecting the axis of the cones and which are squeezed between the pair of cones such that an angle of intersection of the axes of the rollers with respect to the axis of the cones is changed to change the speed ratio of the transmission; an automatic transmission functioning as an electrically controlled continuously variable transmission having a differential mechanism constituted by a planetary gear device configured to distribute a drive force from an engine to a first electric motor and its output shaft, and a second electric motor disposed on the output shaft of the differential mechanism, and wherein the differential mechanism performs a differential operation to mechanically transmit a major portion of the drive force of the engine to the vehicle drive wheels, and to electrically transmit the remaining portion of the drive force through an electric path from the first electric motor to the second electric motor, for thereby electrically changing the speed ratio of the automatic transmission; or an automatic transmission designed to be installed on a so-called parallel type hybrid vehicle wherein an electric motor is operatively connected to an engine shaft or an output shaft.

According to a yet further preferred form of the invention, the above-described parking lock device is configured to establish a locking state in the above-described locking position by engagement of a locking pawl with a locking gear rotating with the above-described wheels in the above-described locking position, and establish a non-locking state in the above-described non-locking position by canceling the locking state. The above-described locking gear may be fixed to an output rotary member of a transmission connected to the above-described wheels, or alternatively to any other rotary member directly connected to the wheels.

MODE FOR CARRYING OUT THE INVENTION

Figure 1:
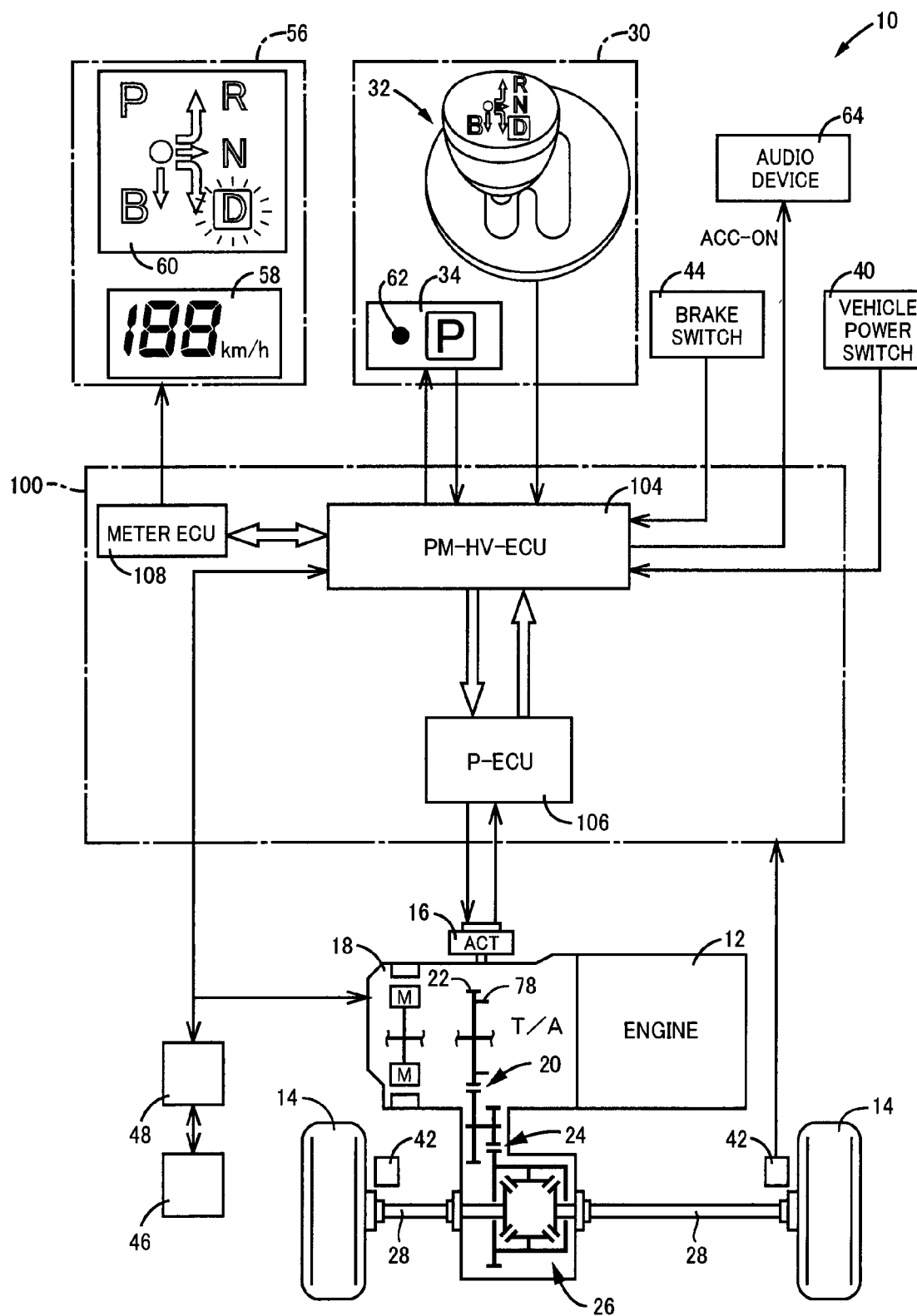
FIG. 1 is a view schematically showing an arrangement of a power transmitting path from an engine of a vehicle to which the present invention is applicable, to drive wheels of the vehicle, and is also a block diagram showing major elements of a control system provided on the vehicle to control a parking lock device and other devices.

An embodiment of the present invention will be described in detail by reference to the drawings.
Embodiment FIG. 1 is the view schematically showing an arrangement of a power transmitting path from an engine 12 of a vehicle 10 to which the present invention is applicable, to drive wheels 14 of the vehicle 10, and is also the block diagram showing major elements of a control system provided on the vehicle 10 to control a parking lock device 16 and other devices. As shown in FIG. 1, the vehicle 10 is provided with the parking lock device 16, a transmission 18, and a manually operable shift operating device 30, and adopts a shift-by-wire (SBW) system configured to electrically change a shift position associated with a manner of running of the vehicle 10, that is, a shift position (shift range) of the transmission 18. The transmission 18 is arranged so as to be suitably used on a transverse FF (front-engine front-drive) type of vehicle 10, so that a drive force of the engine 12 which is a vehicle drive power source in the form of an internal combustion engine is transmitted from an output rotary member of the transmission 18 in the form of an output gear 22 that is one of two gears of a counter gear pair 20, to a pair of drive wheels 14 through a power transmitting device in the form of the counter gear pair 20, a final gear pair 24, a differential gear device 26, and a pair of axles (drive shafts (D/S)) 28, in this order of description. A transaxle (TA) is constituted by the above-described transmission 18, counter gear pair 20, final gear pair 24, differential gear device 26, and other elements. While the present invention will be described as applied to a hybrid vehicle provided with the drive power source in the form of the engine 12 and electric motors M, it is to be understood that the invention is equally applicable to any type of vehicle such as an ordinary engine-driven vehicle, hybrid vehicle, an electric vehicle and a fuel-cell vehicle, provided that the vehicle adopts the shift-by-wire system.

The vehicle 10 is also provided with an electronic control apparatus 100 including a vehicular shift control apparatus configured to control an operation state of the parking lock device 16, and the other devices. For example, the electronic control apparatus 100 is principally constituted by a so-called microcomputer incorporating a CPU, a RAM, a ROM, and an input-output interface. The CPU performs signal processing operations according to control programs preliminarily stored in the ROM while utilizing a temporary data storage function of the RAM, to implement: hybrid drive controls such as an output control of the engine 12 and a drive control of the electric motors M; a shifting control of the transmission 18; a shift position switching control of the transmission 18 using the shift-by-wire system; and a switching control to control the operation state of the parking lock device 16.

The electronic control apparatus 100 is arranged to receive signals such as: shift lever position signals indicative of operating positions $P_{SH}$ and generated from a shift sensor 36 and a select sensor 38 (shown in FIG. 2) which are position sensors for detecting the operating positions $P_{SH}$ of a shift lever 32; a P-switch signal generated from a P switch 34 which is operable by a user to change the shift position of the transmission 18 to a parking position (P position) from any non-P position other than the P position; a P-position signal indicative of an operating state of P-lock in the parking lock device 16 provided to switch the shift position of the transmission 18 between the P position and the non-P position by establishing or canceling a parking lock (P lock); a power switch signal indicative of an operating state of a vehicle power switch 40 operable by the user to apply and remove power to and from the vehicle 10; wheel speed pulse signals generated from rotation speed sensors in the form of wheel speed sensors 42 and indicative of rotating speeds $N_w$ of the wheels (drive wheels 14 and driven wheels) which correspond to a vehicle speed V; a brake operation signal generated from a brake switch 44 and indicative of a brake-on state $B_{ON}$ representing an operated state of a foot brake pedal (not shown) provided to operate a primary vehicle brake system; a signal indicative of a charging current or a discharging current $I_{CD}$ of an electric-energy storage device 46; a signal indicative of a voltage $V_{BAT}$ of the electric-energy storage device 46; and a signal indicative of a state of charging (stored electric energy amount) SOC of the electric-energy storage device 46.

The electronic control apparatus 100 is further arranged to generate signals such as: hybrid control command signals including engine output control command signals for controlling an output of the engine 12, motor control command signals for controlling operations of the electric motors M provided in the transmission 18, and shifting control command signals for controlling shifting operations of the transmission 18; shift position switching control command signals for changing the shift position of the transmission 18; a vehicle speed indication control command signal for controlling a speedometer 58 to indicate the present vehicle speed V, the speedometer 58 being provided in a display device in the form of a known combination meter 56 configured to provide the user with vehicle information relating to a running state of the vehicle; a shift position indication control command signal for controlling a shift position indicator (shift position display device) 60 provided in the combination meter 56, to indicate the selected shift position of the transmission 18; a parking lock indication control command signal (P-lock indication control command signal) for controlling a P-position indicator light 62 provided as a locking indicator light to indicate an operation of a P-lock (parking lock state; P-lock state), i.e. to indicate the shift position is P-position by lighting; and a P switching control command signal for switching the parking lock device 16. It is noted that the P-position indicator light 62 is a display light which is operated without synchronization of an operating state (illuminated/non-illuminated state) of the combination meter 56, and which is built in the P switch 34, for instance.

Described more specifically, the electronic control apparatus 100 is provided with a power source and hybrid control computer (hereinafter referred to as "PM-HV-ECU") 104, a parking control computer (hereinafter referred to as "P-ECU") 106, and a meter control computer (hereinafter referred to as "meter ECU") 108. It is noted that the above-indicated P-ECU 106 corresponds to the vehicular shift control apparatus according to this invention.

For example, the PM-HV-ECU 104 is configured to change a power supply state of the vehicle 10, on the basis of the power switch signal received from the vehicle power switch 40 manually operable by the user. In the present embodiment, the power supply state may be changed to a selected one of: a power-off state (ALL-OFF state; IGACC-OFF state) in which the vehicle 10 cannot be run; a partial power-on state (ACC-ON state; IG-OFF state) in which the vehicle 10 cannot be run but some of the functions of the vehicle 10 can be performed in an off state of the combination meter 56; a power-on state (IG-ON state) in which a power supply relating to the vehicle running is available in an on state of the combination meter 56; and a vehicle-run-ready state (READY-ON state) in which the vehicle running can be controlled according to the hybrid control command signals relating to the vehicle running, and in which the vehicle 10 can be started and run by an operation of an accelerator pedal. The above-indicated some functions of the vehicle 10 that can be performed include a function of power application to permit operations of a navigating system and an audio device 64, and power application to a power source receptacle (not shown) for connection to a battery. The above-indicated IG-ON state is the above-indicated power-on state in which the functions other than the functions for controlling the vehicle running according to the hybrid control command signals can be performed (for instance, the shift position of the transmission 18 can be changed), and in which the engine 12 and the electric motors M cannot be started or operated, that is, the vehicle 10 cannot be started and run even with an operation of the accelerator pedal. The READY-ON state can be established by an operation of the above-described vehicle power source switch 40, under the condition that a failure does not take place in an initial processing operation of the P-ECU 106 and an initial drive control of the parking lock device 16, which are performed or implemented before transition to the READY-ON state. Namely, even if the vehicle power switch 40 has been operated to switch the power supply state to the READY-ON state, the power supply state is not switched to the READY-ON state in the event of an occurrence of such a failure as described above, but is switched to the other state such as the IG-ON state in this event.

For instance, the PM-HV-ECU 104 is configured to permit the power supply state to the READY-ON state from any one of the other states, if an input of the above-indicated power switch signal is detected in the P position and in the brake-on state $B_{ON}$. The PM-HV-ECU 104 is further configured to switch the power supply state to the ALL-OFF state if the vehicle speed V is lower than a predetermined threshold value V' and the input of the power switch signal is detected, in the P position and in the IG-ON or READY-ON state. The PM-HV-ECU 104 is also configured to switch the power supply state of the vehicle 10 such that the ALL-OFF state, ACC-ON state and IG-ON state are sequentially established, repeatedly in this order of description each time the power switch signal is received in the P position and not in the brake-on state $B_{ON}$. The PM-HV-ECU 104 is further configured to apply to the P-ECU 106 an automatic P switching command signal for operating the parking lock device 16 to automatically switch the shift position to the P position, if the vehicle speed V is lower than the predetermined threshold value V' and the input of the power switch signal is detected in the non-P position and in the IG-ON state. In this case, the PM-HV-ECU 104 switches the power supply state of the vehicle 10 to the ALL-OFF state after the P position has been established. (This series of operations to establish the P position is referred to as "automatic P-lock operation".) The above-indicated predetermined threshold value V' is a vehicle-stop-state judging vehicle speed obtained by experimentation and stored in memory, below which it is determined that the vehicle is stationary.

The PM-HV-ECU 104 is also configured to implement an overall control of the operation of the transmission 18, for instance. After the power supply state of the vehicle 10 has been switched to the READY-ON state, for example, the PM-HV-ECU 104 starts the hybrid system for permitting the vehicle running, and applies hybrid control commands relating to the vehicle running, to the engine 12, electric motors M and transmission 18, for controlling the vehicle running. Further, the PM-HV-ECU 104 is configured to apply shift position switching control commands to the transmission 18 for changing its shift position, on the basis of the shift lever position signals which are received from the shift sensor 36 and select sensor 38 and which relate to the operating position $P_{SH}$. If the shift position of the transmission 18 is the P position at this point of time, the PM-HV-ECU 104 applies a P canceling command signal to the P-ECU 106, on the basis of the above-indicated shift lever position signals, for switching the shift position of the transmission 18 from the P position to one of the non-P positions. Further, the PM-HV-ECU 104 applies a P-lock switching command signal to the P-ECU 106, on the basis of the P-switch signal received from the P switch 34, for switching the shift position of the transmission 18 from the non-P position to the P position. Further, the PM-HV-ECU 104 applies a shift position indication signal to the meter ECU 108, for indicating the present shift position. In addition, the PM-HV-ECU 104 applies a parking lock indication control command signal (P-lock indication control command signal) to the P switch 34, on the basis of a P-lock state signal received from the P-ECU 106 and indicative of the P-lock state (P position), for illuminating the P-position indicator light 62 in the P switch 34, to indicate the P-lock state.

The electric-energy storage device 46 is a chargeable and dischargeable direct current power source, which is constituted by a secondary battery such as a nickel hydrogen battery or a lithium ion battery, for example. An electric energy stored in the electric-energy storage device 46 is supplied to the electric motor M through the inverter 48, for accelerating the vehicle or for driving the vehicle with the electric motor M, for instance. When a regenerative brake is applied to the vehicle under deceleration, tan electric energy generated by the electric motor M is stored in the electric-energy storage device 46 through the inverter 48.

The P-ECU 106 is configured to control the operation of the parking lock device 16 to establish or cancel the parking lock, for switching the shift position between the P position and the non-P positions, on the basis of the automatic P switching command signal and P switching command signals (P-lock switching command signal and P switching canceling command signal) received from the PM-HV-ECU 104. The P-ECU 106 is further configured to make a determination as to whether the transmission 18 is placed in the P position or any one of the non-P positions, on the basis of the P-position signal received from the parking lock device 16 and indicative of its operating state, and to apply the P-lock state signal indicative of a result of the determination, to the PM-HV-ECU 104, and the other control devices.

When the power supply state of the vehicle 10 is switched from the ALL-OFF state or ACC-ON state to the IG-ON state or READY-ON state, the P-ECU 106 implements the initial drive control of the parking lock device 16, for controlling the detection of a P-wall position and a non-P-wall position for adequately obtaining the P-position signal and a non-P-position signal, as described below. Prior to implementing the series of initial control operations of the above-indicated parking lock device 16 upon switching of the power supply state of the vehicle 10 is switched from the ALL-OFF state or ACC-ON state to the IG-ON state or READY-ON state, the P-ECU 106 implements its own initial processing operation. It is noted that the P-ECU 106 is held in its power-off state when the present power supply state of the vehicle 10 is the ALL-OFF or ACC-ON state, and in its power-on state when the present power supply state of the vehicle 10 is the IG-ON or READY-ON state. The above-indicated power-off state of the P-ECU 106 is a state in which power is removed from the P-ECU 106, while the above-indicated on-state of the P-ECU 106 is a state in which power is applied to the P-ECU 106.

The meter ECU 108 is configured to apply a vehicle speed indication control command signal to the speedometer 58 in the combination meter 56, for indicating the present vehicle speed V. For example, the meter ECU 108 determines a meter indication vehicle speed signal V by counting the number of rectangular waves of a vehicle speed pulse signal obtained on the basis of the wheel speed pulse signals received from the wheel speed sensors 42. Then, the meter ECU 108 controls the speedometer 58 so as to illuminate the appropriate segments for indicating the present vehicle speed V, on the basis of the determined meter indication vehicle speed signal V. The meter ECU 108 is further configured to apply a shift position indication control command signal to the shift position indicator 60 in the combination meter 56, on the basis of the shift position indication signal received from the PM-HV-ECU 104, so that the shift position indicator 60 indicates the present shift position. For instance, the present shift position is indicated by illuminating an area of the shift position indicator 60 in which an indicium representative of the present shift position is located.

Figure 2:
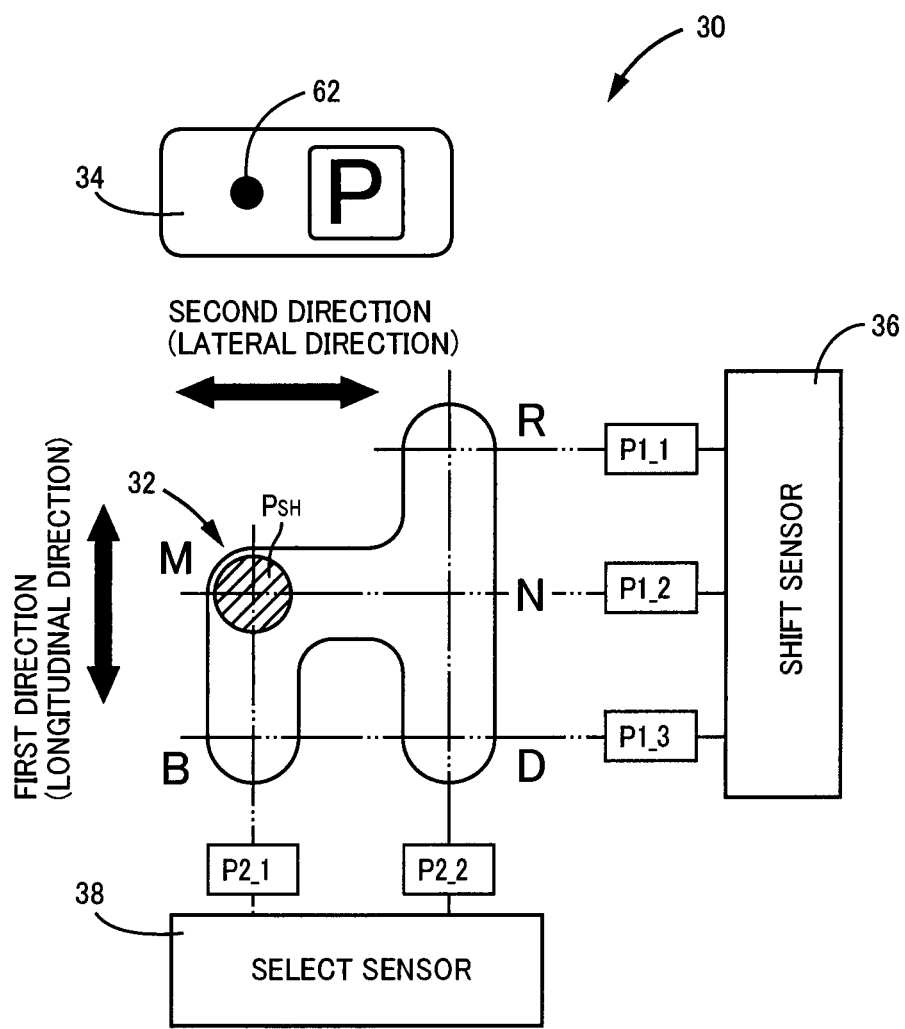
FIG. 2 is a view showing an example of a shift operating device provided as a switching device (manipulator) manually operable to select one of a plurality shift positions of a transmission provided on the vehicle of FIG. 1.

FIG. 2 is the view showing an example of the shift operating device 30 provided as a switching device (manipulator) manually operable to select one of a plurality shift positions of the transmission 18. This shift operating device 30 is provided with the shift lever 32, which is a manually operable member which is disposed near a vehicle operator's seat and which is momentarily operable to the plurality of operating positions $P_{SH}$. Namely, the manually operable member is of an automatic return type which is automatically returned to an original position (initial position) upon removal of an operating force from the member. The shift operating device 30 provided in the present embodiment is also provided with the separate P switch 34 which is disposed near the shift lever 32 and which is a manually operable member momentarily operable to place the shift position of the transmission 18 into the parking position (P position) for establishing the parking lock.

As shown in FIG. 2, the shift lever 32 has the three operating positions $P_{SH}$ consisting of an operating position R, an operating position N and an operating position D which are arranged along a line extending in a front-rear direction or a vertical direction of the vehicle, that is, a longitudinal direction of the vehicle, and the two operating positions $P_{SH}$ consisting of an operating position M and an operating position B which are arranged along another line parallel to the above-indicated line. The shift lever position signals indicative of the respective operating positions $P_{SH}$ are applied to the PM-HV-ECU 104. The shift lever 32 is operable from one of the operating positions R, N and D to another in the longitudinal direction, and between the operating positions M and B in the longitudinal direction, and is further operable between the operating positions N and B in a direction orthogonal with the longitudinal direction, i.e., in a lateral direction of the vehicle.

The P switch 34 is a pushbutton of a momentary operation type, for example, and generates the P-switch signal to be generated to the PM-HV-ECU 104 each time the pushbutton is pressed by the user. When the P switch 34 is pressed while the shift position of the transmission 18 is placed in one of the non-P positions, for instance, the P-ECU 106 operates to switch the shift position to the P position, on the basis of the P switching command signal received from the PM-HV-ECU 104, if predetermined conditions are satisfied. These conditions include a condition that the vehicle speed V is not higher than a P-lock permission value Vp. This P position is a parking position in which the power transmitting path in the transmission 18 is cut off, while at the same time the parking lock device 16 is placed in a parking lock state in which the rotation of the drive wheels 14 is mechanically prevented. The P switch 34 incorporates the P-position indicator light 62, which is illuminated under the control of the PM-HV-ECU 104, when the P-lock state signal received from the P-ECU 106 indicates the P position.

The operating position M of the shift lever 32 of the shift operating device 30 is the initial position (home position) of the shift lever 32. The shift lever 32 placed in any operating position $P_{SH}$ (operating position R, N, D or B) other than the operating position M is returned to the operating position M by a mechanism such as a spring device, when the vehicle operator releases the shift lever 32, that is, when the operating force acting on the shift lever 32 is removed. When the shift operating device 30 is operated to one of the operating positions $P_{SH}$, the PM-HV-ECU 104 operates to establish the shift position corresponding to that operating position $P_{SH}$, on the basis of the shift lever position signals indicative of the operating position $P_{SH}$ in question, and to command the shift position indicator 60 to indicate the present operating position $P_{SH}$, that is, the established shift position of the transmission 18.

The shift positions will be described. The R position established when the shift lever 32 is operated to the operating position R is a reverse-drive position in which a drive force is transmitted to the drive wheels 14 to drive the vehicle in the reverse direction. The N position established when the shift lever 32 is operated to the operating position N is a neutral position in which the power transmitting path in the transmission 18 is cut off. The D position established when the shift lever 32 is operated to the operating position D is a forward-drive position in which a drive force is transmitted to the drive wheels 14 to drive the vehicle in the forward direction. When the PM-HV-ECU 104 determines on the basis of the shift lever position signals that the shift lever 32 has been operated to one of the operating positions $P_{SH}$ (more specifically, operating position R, N or D) in which the parking lock of the vehicle should be canceled, while the shift position is P position, the PM-HV-ECU 104 applies the P canceling command signal to the P-ECU 106 to cancel the parking lock, if predetermined conditions are satisfied. These conditions include a condition that the vehicle is placed in the brake-on state $B_{ON}$. On the basis of the P canceling command signal received from the PM-HV-ECU 104, the P-ECU 106 applies the P switching control command signal to the parking lock device 16 to cancel the parking lock. Then, the PM-HV-ECU 104 operates to establish the shift position corresponding to the presently established operating position $P_{SH}$.

The B position established when the shift lever 32 is operated to the operating position B is a forward-deceleration-drive position (engine braking range) in which the drive wheels 14 are decelerated with an engine braking effect provided by a regenerative braking torque generated by the electric motor M during running of the vehicle in the D position, for example. The PM-HV-ECU 104 invalidates an operation of the shift lever 32 to the operating position B if the presently established shift position is other than the D position, and validates this operation of the shift lever 32 to the operating position B only if the presently established shift position is the D position. If the shift lever 32 is operated by the vehicle operator to the operating position B when the P position is presently established, for instance, the presently established P position is maintained.

In the shift operating device 30 according to the present embodiment, the shift lever 32 is returned to the operating position M upon removal of the operating force from the shift lever 32. Accordingly, the presently established shift position cannot be recognized by visual observation of the operating position $P_{SH}$ of the shift lever 32. For this reason, the shift position indicator 60 is disposed at a position for easy observation by the vehicle operator, so that the presently established shift position (which may be the P position) is indicated by the shift position indicator 60.

In the shift operating device 30 of the present embodiment which adopts the so-called "shift-by-wire (SBW)" system, the shift lever is operated two-dimensionally in a first direction P1 which is the above-indicated longitudinal direction, and a second direction P2 which is the lateral direction intersecting the first direction P1 (perpendicular to the first direction P1 in the present example of FIG. 2). Accordingly, the shift operating device 30 is provided with the shift sensor 36 as a first-direction detecting portion for detecting an operation of the shift lever in the above-indicated first direction P1, and the select sensor 38 as a second-direction detecting portion for detecting an operation of the shift lever in the above-indicated second direction P2, in order to supply the electronic control apparatus 100 with position sensor signals indicative of the presently established operating position $P_{SH}$. Each of the shift sensor 36 and select sensor 38 applies a voltage signal as its output signal (a signal indicating the position of the shift lever) corresponding to the operating position $P_{SH}$ to the electronic control apparatus 100, so that the electronic control apparatus 100 recognizes (determines) the operating position $P_{SH}$ on the basis of a voltage represented by the voltage signal. Namely, it is considered that the above-described first-direction detecting portion (shift sensor 36) and second-direction detecting portion (select sensor 38) cooperate with each other to constitute an operating-position detecting portion for detecting the operating position $P_{SH}$ of the shift operating device 30.

An example of a manner of recognizing the operating position $P_{SH}$ will be described. An output signal voltage $V_{SF}$ of the shift sensor 36 has different levels at respective first-direction first, second and third positions P1_1, P1_2 and P1_3 that are respectively the R operating position, the M and N operating positions and the B and D operating positions (, which levels fall within respective low, medium and high ranges, for example), and an output signal voltage $V_{SL}$ of the select sensor 38 has different levels at respective second-direction first and second positions P2_1 and P2_2 that are respectively the M and B operating positions and the R, N and D operating positions (, which levels fall within respective low and high ranges, for example). The PM-HV-ECU 104 detects the above-described different levels of the above-indicated output signal voltages $V_{SF}$ and $V_{SL}$, and recognizes the operating positions $P_{SH}$ (R, N, D, M and B) on the basis of respective different combinations of the levels of the two output signal voltages.

Figure 3:
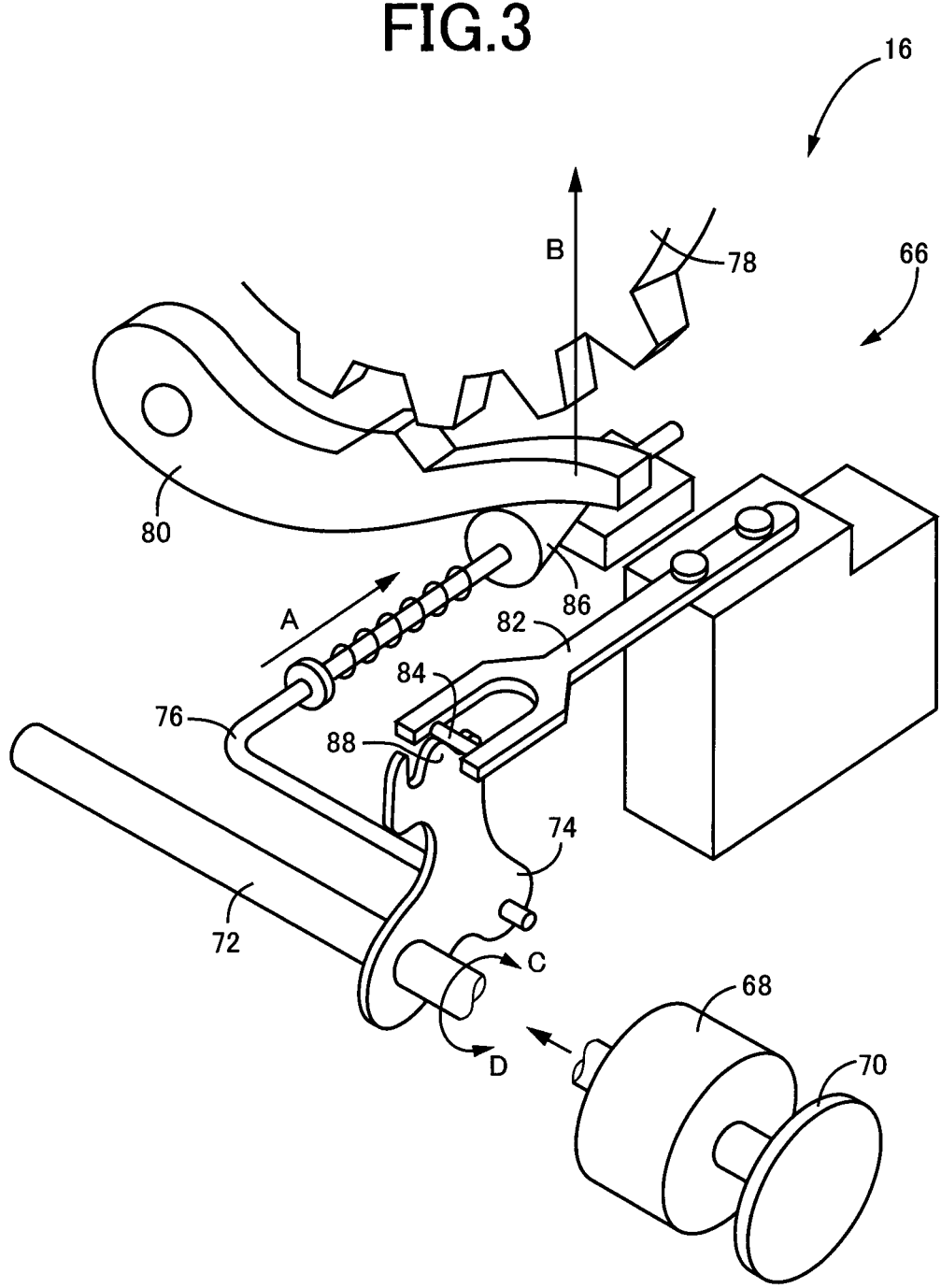
FIG. 3 is a view showing an arrangement of a parking lock device provided in the vehicle of FIG. 1 to mechanically prevent rotation of the drive wheels.

FIG. 3 is the view showing an arrangement of the parking lock device 16 provided to mechanically prevent rotation of the drive wheels 14. As shown in FIG. 3, the parking lock device 16 is provided with a P-lock mechanism (parking-lock mechanism) 66, an electrically operated actuator in the form of a P-lock drive motor (parking-lock drive motor) 68, and an encoder 70, and is operated to prevent a movement of the vehicle 10, on the basis of control signals from the electronic control apparatus 100.

The P-lock drive motor 68, which corresponds to the electrically operated actuator provided according to the present invention, is a switched reluctance motor (SR motor), for instance, and is operated to operate the P-lock mechanism 66, in the shift-by-wire system according to commands (control signals) received from the P-ECU 106. The P-lock drive motor 68 is provided with a P-motor power source relay (not shown), so that an electric power is applied and removed to and from the P-lock drive motor 68. The P-motor power source relay is configured to cut off the electric power to the P-lock drive motor 68 for inhibiting an operation of the P-lock drive motor 68, when a supply voltage $V_{MR}$ applied to the P-lock drive motor 68 is not higher than a predetermined relay switching value. On the other hand, the P-motor power source relay applies the electric power to the P-lock drive motor 68 for permitting the operation of the P-lock drive motor 68, when the supply voltage $V_{MR}$ applied to the P-lock drive motor 68 is higher than the predetermined relay switching value. The above-indicated relay switching value is preliminarily obtained by experimentation to determine whether the above-indicated supply voltage $V_{MR}$ is sufficiently high to enable the P-lock drive motor 68 to generate a torque sufficient to rotate or pivot a detent plate 74 with a high degree of stability.

The encoder 70 is a rotary encoder configured to generate A-phase, B-phase and Z-phase signals, for example, and is rotated together with the P-lock drive motor 68. The encoder 70 detects a rotary motion of the SR motor and generates a signal representative of the rotary motion, that is, a pulse signal for obtaining a count (encoder count) corresponding to an amount of motion (angle of rotation) of the P-lock drive motor 68. The pulse signal generated by the encoder 70 is applied to the P-ECU 106, so that the P-ECU 106 recognizes the rotary motion of the SR motor, and controls energization of the SR motor to drive.

The P-lock mechanism 66 is provided with: a shaft 72 rotated by the P-lock drive motor 68; the detent plate 74 rotated or pivoted by a rotary motion of the shaft 72; a rod 76 moved by a rotary or pivotal motion of the detent plate 74; a parking gear 78 rotated together with the drive wheels 14; a parking lock pawl 80 for preventing a rotary motion of (for locking) the parking gear 78; a detent spring 82 provided to limit the rotary or pivotal motion of the detent plate 74 for locking the shift position; and a roller 84. A location at which the parking gear 78 is disposed is not limited, provided that the drive wheels 14 are locked when the parking gear 78 is locked. For instance, the parking gear 78 may be coaxially fixed to the output gear 22 of the transmission 18 (see FIG. 1).

The detent plate 74 is operatively connected to a drive shaft of the P-lock drive motor 68 through the shaft 72, and cooperates with the rod 76, detent spring 82, roller 84, etc. to function as a parking lock positioning member which is operated by the P-lock drive motor 68 for switching between the parking lock position corresponding to the P position and the non-parking lock position corresponding to the shift positions other than the P position (corresponding to the non-P positions). The shaft 72, detent plate 74, rod 76, detent spring 82 and roller 84 cooperate to function as a parking lock switching mechanism.

FIG. 3 shows a state in which the non-parking lock position is established, that is, any one of the non-P positions is established as the shift position. In this state, the parking gear 78 is not locked by the parking lock pawl 80, the rotation of the drive wheels 14 is not prevented by the P-lock mechanism 66. A rotary or pivotal motion of the shaft 72 by the P-lock drive motor 68 in a direction indicated by an arrow C in FIG. 3 from the position of this state causes the rod 76 to be pressed through the detent plate 74 in a direction indicated by an arrow A in FIG. 3, so that the parking lock pawl 80 is pivoted upwards in a direction indicated by an arrow B in FIG. 3 by a tapered member 86 provided at one end of the rod 76. As a result of the pivotal motion of the detent plate 74, the roller 84 of the detent spring 82 is moved from one of two recesses formed in an upper end portion of the detent plate 74, namely, moved from a non-parking lock position 90 (hereinafter referred to as a "non-P position 90": indicated in FIG. 4), along a crest 88 into the other of the two recesses, namely, to a parking-lock position 92 (hereinafter referred to as a "P position 92": indicated in FIG. 4). The roller 84 is provided on the detent spring 82 such that the roller 84 is rotatable about its axis. When the detent plate 74 has been rotated or pivoted to cause the roller 84 to be moved to the P position 92, the parking lock pawl 80 has been pivoted upwards into meshing engagement with the parking gear 78. Thus, the drive wheels 14 with which the parking gear 78 is rotated are mechanically locked, and the shift position is switched to the P position. For reducing a load acting on the P-lock mechanism 66 of the parking lock device 16 including the detent plate 74, detent spring 82 and shaft 72, upon switching of the shift position between the P position and the non-P position, the P-ECU 106 controls the amount of rotation of the P-lock drive motor 68 so as to reduce an impact which acts on the roller 84 of the detent spring 82 has been moved downwards along the crest 88 into each of the above-indicated two recesses. The parking lock device 16 is considered to have a locking position (P position) in which the roller 84 is located at the P position 92 for inhibiting the rotation of the drive wheels (vehicle wheels) 14, and a non-lock position (non-P position) in which the roller 84 is located at the non-P position 90 for permitting the rotation of the drive wheels (vehicle wheels) 14.

As described above, the parking lock device 16 is selectively switched to the above-indicated locking position or the above-indicated non-locking position, by the operation of the P-lock drive motor 68 on the basis of the command from the P-ECU 106. In other words, the parking lock device 16 is switched according to a manual operation by the vehicle operator, between a locking state (P-lock state) in which a locking tooth in the form of the parking lock pawl 80 is in meshing engagement with rotary teeth in the form of the parking gear 78 rotated with the vehicle wheels (drive wheels 14), and a non-locking state (non-P lock state) in which the locking state is canceled.

Figure 4:
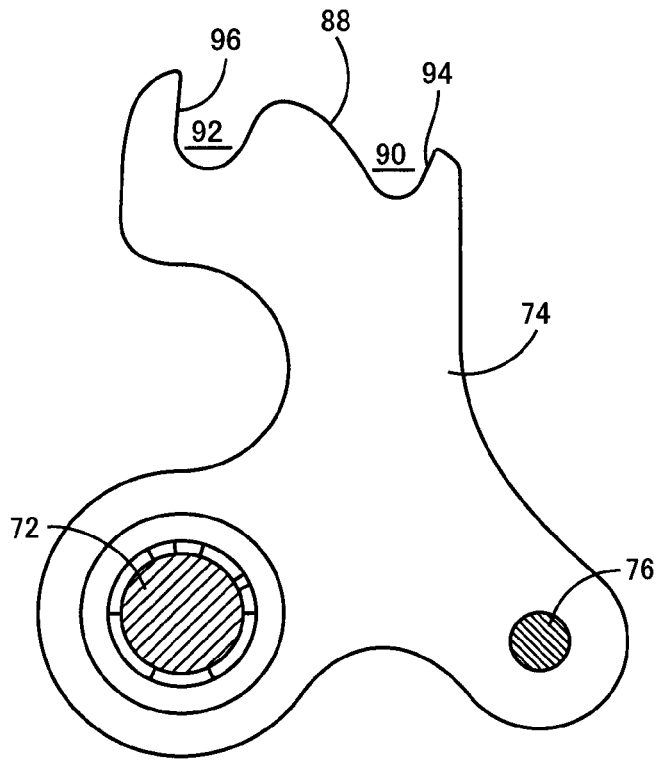
FIG. 4 is a view showing an arrangement of a detent plate provided in the parking lock device of FIG. 3.

FIG. 4 is the view showing an arrangement of the detect plate 74. In each of the two recesses, one of two surfaces of the two recesses which is remote from the crest 88 is called a "wall". Namely, the wall of each recess is positioned such that the wall comes into abutment on the roller 84 of the detent spring 82 when the roller 84 has been moved downwards along the crest 88 into the corresponding recess while the P-ECU 106 does not execute the following control. The wall at the P position 92 is called a "P wall", while the wall at the non-P position 90 is called a "non-P wall". When the roller 84 is moved from the P position 92 to the non-P position 90, the P-ECU 106 controls the P-lock drive motor 68 so as to prevent the non-P wall 94 from abutting on the roller 84. Described more specifically, the P-ECU 106 stops the rotary motion of the P-lock drive motor 68 before the non-P wall 94 comes into abutment on the roller 84. An angular position at which the rotary motion of the P-lock drive motor 68 is stopped as described above is called a "target non-P angular position". When the roller 84 is moved from the non-P position 90 to the P position 92, the P-ECU 106 controls the P-lock drive motor 68 so as to prevent the P wall 96 from abutting on the roller 84. Described more specifically, the P-ECU 106 stops the rotary motion of the P-lock drive motor 68 before the P wall 96 comes into abutment on the roller 84. An angular position at which the rotary motion of the P-lock drive motor 68 is stopped as described above is called a "target P angular position". With the P-lock drive motor 68 being thus controlled by the P-ECU 106, the load acting on the P-lock mechanism 66 including the detent plate 74, detent spring 82 and shaft 72 upon switching of the shift position can be considerably reduced. The reduction of the load makes it possible to reduce the size and cost of manufacture of the P-lock mechanism 66.

Figure 5:
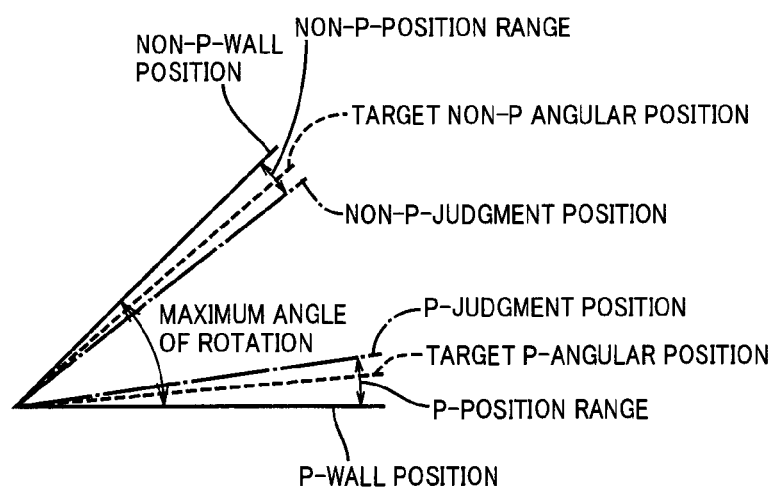
FIG. 5 is a view indicating a relationship between an angle of rotation of a P-lock drive motor provided in the parking lock device of FIG. 3, namely, an encoder count, and the shift positions.

FIG. 5 is the view indicating a relationship between an angle of rotation of the P-lock drive motor 68, that is, the encoder count, and the shift positions. The angle of rotation of the P-lock drive motor 68 provided to rotate the detent plate 74 is limited by the non-P wall 94 and the P wall 96. FIG. 5 schematically indicates the position of the P wall 96 (P-wall position) and the position of the non-P wall 94 (non-P-wall position), in connection with the control of the rotary motion of the P-lock drive motor 68. The P-wall position and the non-P-wall position define a maximum angle of rotation of the P-lock drive motor 68. A P-judgment position and a non-P-judgment position indicated in FIG. 5 are predetermined angular positions of the detent plate 74 at which a judgment of the switching of the shift position is made. That is, an angular range from the P-judgment position to the P-wall position is a P-position range, while an angular range from the non-P-judgment position to the non-P-wall position is a non-P-position range. When the angle of rotation of the P-lock drive motor 68 detected by the encoder 70 is held within the P-position range, it is judged that the P position is established as the shift position. When the angle of rotation of the P-lock drive motor 68 is held within the non-P-position range, it is judged that the non-P position is established as the shift position. When the angle of rotation of the P-lock drive motor 68 is held within a range from the P-judgment position to the non-P-judgment position, it is judged that the shift position has not been established, or that the shift position is being switched. The above-described judgments are made by the P-ECU 106.

As also indicated in FIG. 5, a target P angular position is set within the P-position range, and a target non-P angular position is set within the non-P-position range. The target P angular position is a position at which the P wall 96 does not abut on the roller 84 of the detent spring 82 during switching from the non-P position to the P position. This target P angular position is set with a predetermined amount of margin with respect to the P-wall position. This amount of margin is determined by taking account of an error due to a chronological change. The thus determined margin can absorb the chronological change after a considerably large number of operations of the parking lock device, making possible to avoid a mutual abutting contact of the P wall 96 and the roller 84 during switching of the shift position from the non-P position to the P position. Similarly, the target non-P angular position is a position at which the non-P wall 94 does not abut on the roller 84 of the detent spring 82 during switching from the P position to the non-P position. This target non-P angular position is set with a predetermined amount of margin with respect to the non-P wall position. This amount of margin is determined by taking account of an error due to a chronological change. The thus determined margin can absorb the chronological change after a considerably large number of operations of the parking lock device, making possible to avoid a mutual abutting contact of the non-P wall 94 and the roller 84 during switching of the shift position from the P position to the non-P position. The amounts of margin with respect to the non-P-wall position and the P-wall position need not be equal to each other, and may be determined to be different values depending upon a geometric configuration of the detent plate 74, for instance.

In the parking lock device 16 arranged as described above, the P-ECU 106 obtains the encoder count corresponding to the angle of rotation of the P-lock drive motor 68, on the basis of the pulse signal generated from the encoder 70. Further, the P-ECU 106 resets the encoder count when the power supply state of the vehicle 10 is the ALL-OFF state or the ACC-ON state, for example, and updates the encoder count on the basis of the output signal of the encoder 70 when the power supply state is switched from the ALL-OFF or ACC-ON state to the IG-ON or READY-ON state. In the present embodiment, the encoder count is reduced when the rotation takes place in the direction toward the P-wall position (in the direction indicated by the arrow C in FIG. 3). Further, the P-ECU 106 controls the P-lock drive motor 68 such that the obtained encoder count coincides with predetermined target encoder counts (target count values). These target count values are preliminarily obtained by experimentation, for instance, as target values at which the target P angular position and target non-P angular position of the P-lock drive motor 68 are established.

The relationship between the angle of rotation of the P-lock drive motor 68 and the shift positions has been described. By the way, it is noted that the encoder 70 is a relative angular position sensor, and that the P-ECU 106 loses information on an absolute angular position of the P-lock drive motor 68, for example, information on the above-described P-wall position and the above-described non-P-wall position when the P-ECU 106 is placed in the power-off state. Therefore, the P-ECU 106 is required to obtain the absolute angular position of the P-lock drive motor 68 when the P-ECU 106 is switched from the power-off state to the power-on state. A method of controlling the angular position of the P-lock drive motor 68 by using the encoder 70 which obtains the relative positional information will be described in detail.

Figure 6:
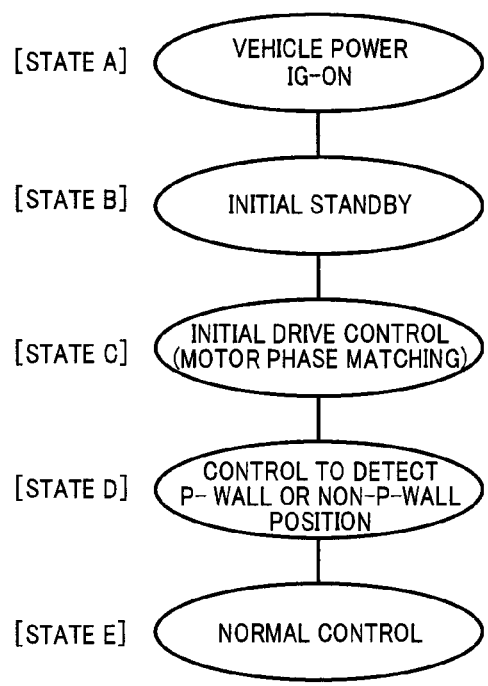
FIG. 6 is a state transition view indicating a series of initial controls of the parking lock device upon switching of a P-ECU from its power-off state to its power-on state as a result of a change of a power supply state of the vehicle of FIG. 1 from an ALL-OFF state or an ACC-ON state to an IG-ON state.

FIG. 6 is the state transition view indicating a series of initial controls of the parking lock device 16 upon switching of the P-ECU 106 from its power-off state to its power-on state as a result of an operation of the vehicle power switch 40 to change the power supply state of the vehicle 10 from the ALL-OFF state or ACC-ON state to the IG-ON state. When the PM-HV-ECU 104 switches the power supply state of the vehicle 10 from the ALL-OFF state or ACC-ON state to the IG-ON state [STATE A], as indicated in FIG. 6, the P-ECU 106 is switched from the power-off state to the power-on state, and implements an initial standby until a relay (P-motor power source relay) of the P-lock drive motor 68 has been closed [STATE B]. In this STATE B, the P-ECU 106 implements its own initial processing operation. Successively, the P-ECU 106 implements an initial drive control of the P-lock drive motor 68, such as an excitation matching (phase matching) operation of the P-lock drive motor 68, so as to assure an adequate control of the operation of the P-lock drive motor 68 [STATE C]. Then, the P-ECU 106 detects the above-described P-wall position or non-P-wall position to set a reference position [STATE D]. After the reference position has been set, the P-ECU 106 implements a normal control for establishing or canceling the parking lock on the basis of an operation of the P switch 34 or a shifting operation by the user [STATE E]. It is noted that the power supply state of the vehicle 10 cannot be switched to the READY-ON state in the event of an occurrence of a failure (for example, a failure of the P-lock drive motor 68) in the process of transition to the above-indicated STATE E when the vehicle power switch 40 is operated to switch the power supply state to the READY-ON state. This aspect will be described by reference to FIGS. 11, 12, etc. A method of control of the above-described detection of the P-wall position and non-P-wall position (in the above-indicated STATE D) will be described.

Figure 7:
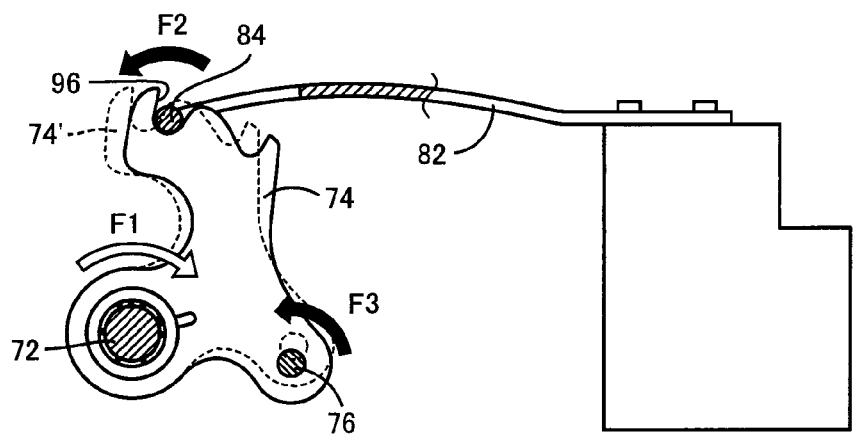
FIG. 7 is a view for explaining a method of control to detect a P-wall position by a P-wall position detecting control executed by the P-ECU of FIG. 1.

FIG. 7 is the view for explaining the method of control to detect the P-wall position. In a P-wall position detecting control executed by the P-ECU 106, the P-lock drive motor 68 is initially operated to rotate or pivot the detent plate 74 in the direction indicated by the arrow C in FIG. 3, that is, in the direction to cause the P wall 96 to move toward the roller 84 of the detent spring 82, until the P wall 96 comes into abutting contact with the roller 84. The P wall 96 functions as a member to limit the rotary motion of the P-lock drive motor 68 in the predetermined direction indicated by the arrow C in FIG. 3, at the P position 92, namely, at a predetermined shift position in the form of the P position 92. It is noted that the P wall 96 may be configured to cooperate with the detent spring 82 and roller 84 to constitute the above-indicated member to limit the rotary motion. Arrows F1, F2 and F3 in FIG. 7 respectively indicate a torque generated by the P-lock drive motor 68, a biasing force of the detent spring 82, and a pressing force generated by the rod 76 and acting against the torque. Broken line indicates the position of the detent plate 74' at which the P wall 96 and the roller 84 abut on each other. Accordingly, the position of the P wall 96 can be detected by detecting this position of the detent plate 74'.

After the P wall 96 abuts on the roller 84, the detent plate 74 is pivoted from the position indicated by the broken line, by the torque F1 of the P-lock drive motor 68, in the direction indicated by the arrow C in FIG. 3, against the biasing force of the detent spring 82. Consequently, the detent spring 82 is deflected, causing an increase of the biasing force F2 and an increase of the pressing force F3 generated by the rod 76. The pivotal motion of the detent plate 74 is stopped when the torque F1 becomes equal to a sum of the biasing force F2 and the pressing force F3.

The P-ECU 106 determines a moment of stopping of the pivotal motion of the detent plate 74 on the basis of the obtained encoder count. For example, the P-ECU 106 determines that the pivotal motion of the detent plate 74 and the rotary motion of the P-lock drive motor 68 is stopped, if the smallest or largest value of the encoder count is kept unchanged for a predetermined length of time. Which one of the smallest and largest values is monitored is selected depending upon the encoder 70. Irrespective of which one of the smallest and largest value is monitored, a fact that the smallest or largest value is kept unchanged for the predetermined length of time indicates that the detent plate 74 is kept stationary.

The P-ECU 106 detects, as a provisional P-wall position, the angular position of the detent plate 74 at which the rotary motion is stopped, and calculates an amount or angle of deflection of the detent spring 82. For instance, this amount or angle of deflection is calculated according to a map which is preliminarily stored in the P-ECU 106 and which represents a relationship between the amount or angle of deflection and the voltage (supply voltage $V_{MR}$) applied to the P-lock drive motor 68. The P-ECU 106 calculates the amount or angle of deflection on the basis of the voltage applied to the P-lock drive motor 68 upon detection of the provisional P-wall position, and according to the map. It is noted that a map using the voltage $V_{BAT}$ of the electric-energy storage device 46 in place of the applied voltage of the P-lock drive motor 68 may be used. The voltage $V_{BAT}$ of the electric-energy storage device 46 is monitored by the P-ECU 106 and can be easily detected. In this case, the map must be prepared by taking account of an amount of drop of the voltage due to wire harness, etc. in a power supply line from the electric-energy storage device 46 to the P-lock drive motor 68.

The P-ECU 106 compensates the provisional P-wall position on the basis of the amount or angle of deflection calculated according to the above-indicated map, and determines the compensated provisional P-wall position as the final P-wall position. The P-ECU 106 sets the encoder value at the final P-wall position, as a CNTP value. Then, the P-ECU 106 operates the P-lock drive motor 68 to rotate or pivot the detent plate 74 in the direction indicated by the arrow D in FIG. 3, that is, in the direction causing the P wall 96 to move away from the roller 84 of the detent spring 82, until the encoder count is zeroed, so that the detent plate 74 is brought to the predetermined P position. This predetermined P position, which is set within the P-position range, is set such that a difference between the encoder counts at the P position and the final P-wall position is equal to the CNTP value. The predetermined P position may be set as the target P angular position. Thus, the target P angular position can be set by determining the final P-wall position. It is noted that the map representative of the relationship between the applied voltage and the amount or angle of deflection may be replaced by a map representative of an output torque of the P-lock chive motor 68 and the amount or angle of deflection. Instead of calculating the amount or angle of deflection with the map, a sensor may be used to detect the amount or angle of deflection.

Figure 8:
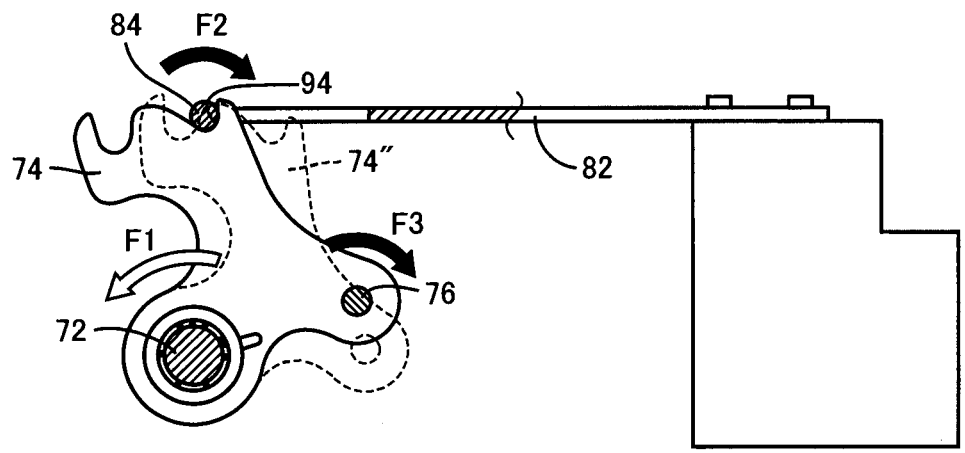
FIG. 8 is a view for explaining a method of control to detect a non-P-wall position by a non-P-wall position detecting control executed by the P-ECU of FIG. 1.

FIG. 8 is the view for explaining a method of control to detect the non-P-wall position. In a non-P-wall position detecting control executed by the P-ECU 106, the P-lock drive motor 68 is initially operated to rotate or pivot the detent plate 74 in the direction indicated by the arrow D in FIG. 3, that is, in the direction to cause the non-P wall 94 to move toward the roller 84 of the detent spring 82, until the non-P wall 94 comes into abutting contact with the roller 84. The non-P wall 94 functions as a member to limit the rotary motion of the P-lock chive motor 68 in the predetermined direction indicated by the arrow D in FIG. 3, at the non-P position 90, namely, at a predetermined shift position in the form of the non-P position 90. It is noted that the non-P wall 94 may be configured to cooperate with the detent spring 82 and roller 84 to constitute the above-indicated member to limit the rotary motion. Arrows F1, F2 and F3 in FIG. 8 respectively indicate a torque generated by the P-lock drive motor 68, a biasing force of the detent spring 82, and a tensile force generated by the rod 76 and acting against the torque. Broken line indicates the position of the detent plate 74" at which the non-P wall 94 and the roller 84 abut on each other. Accordingly, the position of the non-P wall 94 can be detected by detecting this position of the detent plate 74".

After the non-P wall 94 abuts on the roller 84, the detent plate 74 is pivoted from the position indicated by the broken line, by the torque F1 of the P-lock drive motor 68, in the direction indicated by the arrow D in FIG. 3, against the biasing force F2 of the detent spring 82. Consequently, the detent spring 82 is tensioned, causing an increase of the biasing force F2 and an increase of the tensile force F3 generated by the rod 76. The pivotal motion of the detent plate 74 is stopped when the torque F1 becomes equal to a sum of the biasing force F2 and the tensile force F3.

The P-ECU 106 determines a moment of stopping of the pivotal motion of the detent plate 74 on the basis of the obtained encoder count. For example, the P-ECU 106 determines that the pivotal motion of the detent plate 74 and the rotary motion of the P-lock drive motor 68 is stopped, if the smallest or largest value of the encoder count is kept unchanged for a predetermined length of time.

The P-ECU 106 detects, as a provisional non-P-wall position, the angular position of the detent plate 74 at which the rotary motion is stopped, and calculates an amount of elongation of the detent spring 82. For instance, this amount of elongation is calculated according to a map which is preliminarily stored in the P-ECU 106 and which represents a relationship between the amount of elongation and the voltage applied to the P-lock drive motor 68. The P-ECU 106 calculates the amount of elongation on the basis of the voltage applied to the P-lock drive motor 68 upon detection of the provisional non-P-wall position, and according to the map.

The P-ECU 106 compensates the provisional non-P-wall position on the basis of the amount of elongation calculated according to the above-indicated map, and determines the compensated provisional non-P-wall position as the final non-P-wall position. The P-ECU 106 sets the encoder value at the final non-P-wall position, as a CNTCP value. Then, the P-ECU 106 operates the P-lock drive motor 68 to rotate or pivot the detent plate 74 in the direction indicated by the arrow C in FIG. 3, that is, in the direction causing the non-P wall 94 to move away from the roller 84 of the detent spring 82, until the encoder count is reduced by a predetermined value to a value CP, so that the detent plate 74 is brought to the predetermined non-P position. This predetermined non-P position, which is set within the non-P-position range, is set such that a difference between the encoder counts at the non-P position and the final non-P-wall position is equal to a predetermined value. The predetermined non-P position may be set as the target non-P angular position. Thus, the target non-P angular position can be set by determining the final non-P-wall position. It is noted that the map representative of the relationship between the applied voltage and the amount of elongation may be replaced by a map representative of the output torque of the P-lock drive motor 68 and the amount of elongation. Instead of calculating the amount of elongation with the map, a sensor may be used to detect the amount of elongation.

As described above, the reference position can be set by detecting the wall position corresponding to the shift position to be established, on the basis of the obtained encoder count during a rotary motion (operation) of the P-lock drive motor 68 in the direction of limitation of the rotary motion, while the P-ECU 106 is placed in the power-on state in which the IG-ON state is established as the power supply state of the vehicle 10.

Figure 9:
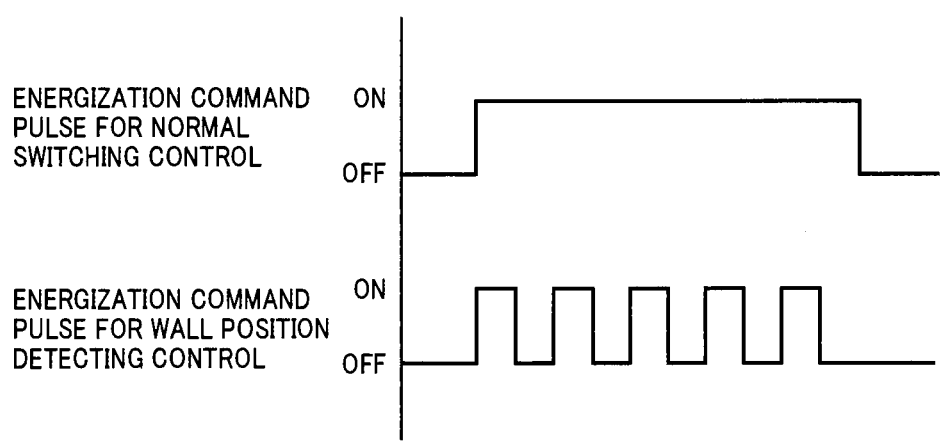
FIG. 9 is a view for explaining waveforms of an energization command pulse applied to an actuator (P-lock drive motor) provided in the parking lock device of FIG. 3.

FIG. 9 is the view for explaining waveforms of an energization command pulse applied to the P-lock drive motor 68. In a normal control of switching of the shift position, an energization command pulse having a relatively long period of a high (ON) state is applied to the P-lock drive motor 68. On the other hand, an energization command pulse to be applied to the P-lock drive motor 68 in the wall position detecting controls executed by the P-ECU 106 is formulated so that an output of the P-lock drive motor 68 per unit time in the wall position detecting controls is smaller than that in the normal control of switching of the shift position. Described more specifically, the energization command pulse to be applied to the P-lock drive motor 68 has a relatively short period of an ON state. An impact upon abutting contact between the wall (non-P wall 94 or P wall 96) and the roller 84 can be reduced by reducing the operating speed of the P-lock drive motor 68 in the wall position detecting controls. It is noted that each of three U, V and W phases of the P-lock drive motor 68 is energized when an energization command for each phase is in the ON state while the energization command pulse indicated in FIG. 9 is in the ON state.

As described above, the P-ECU 106 is configured to first implement its own initial processing operation and then implement the initial control to detect the wall positions of the parking lock device 16, when the vehicle power switch 40 is operated to switch the power supply state of the vehicle 10 to the IG-ON state or READY-ON state, that is, when the P-ECU 106 is switched from its power-off state to its power-on state. Namely, the initial control for the parking lock device 16 includes the initial drive control of the P-lock drive motor 68, and the following detection of the above-indicated P-wall position and non-P-wall position to set the reference positions. That is, the practical maximum angle of rotation of the P-lock drive motor 68 which is defined by and between the detected P-wall position and non-P-wall position can be measured by implementing the wall position detecting controls to detect the wall position corresponding to one of the two shift positions and then the wall position corresponding to the other shift position. The absolute angular position of the P-lock drive motor 68 can be obtained by detecting the wall positions, so that the target angular positions can be set.

If the P-ECU 106 detects that the P-lock drive motor 68 is not operable in the above-described initial drive control of the P-lock drive motor 68 implemented prior to the above-described wall position detecting controls, for instance, the P-ECU 106 which has recognized a failure of the drive motor 68 does not, as a principle, implement the above-described wall position detecting controls that require an operation of the P-lock drive motor 68 and inhibits the transition of the power supply state of the vehicle 10 to the READY-ON state. The failure of the P-lock drive motor 68 may be a hardware defect of the P-lock drive motor 68 per se, or a drop of the supply voltage $V_{MR}$ of the P-lock drive motor 68 (hereinafter referred to as "P-motor supply voltage $V_{MR}$") below the lowest value (for example, the above-indicated relay switching value") required to enable the drive motor 68 to be operated. An example of the failure of the P-lock drive motor 68 due to the drop of the P-motor supply voltage $V_{MR}$ detected by the P-ECU 106 will be described by reference to FIG. 10.

Figure 10:
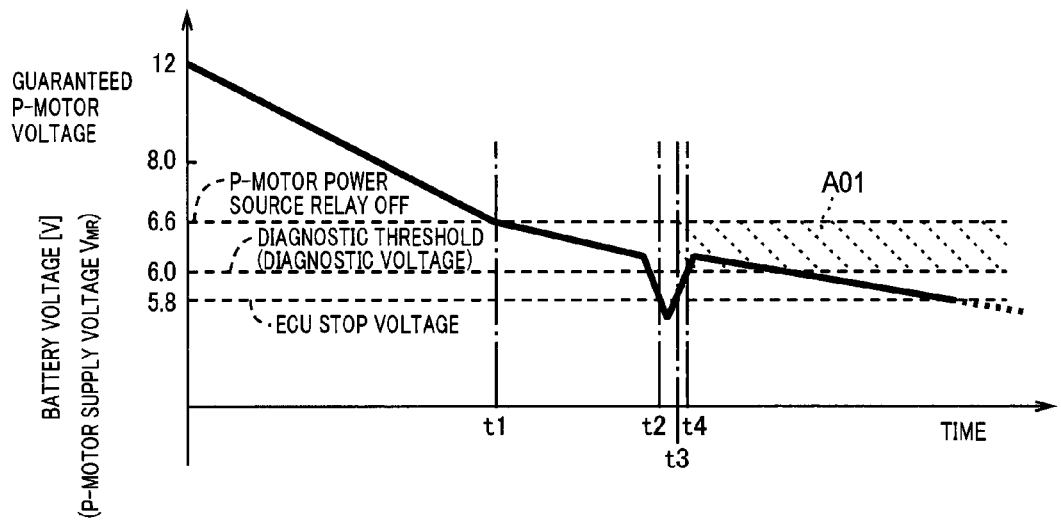
FIG. 10 is a time chart for explaining power application to the P-ECU after instantaneous power removal from the P-ECU, in the case where a battery voltage which is a P-motor supply voltage is gradually lowered from 12V as a result of continuation of the power-on state of the P-ECU of FIG. 1 while the engine is kept at rest.

FIG. 10 is the time chart for explaining the case where a battery voltage which is the P-motor supply voltage $V_{MR}$ is gradually lowered from 12V as a result of continuation of the power-on state of the P-ECU 106 while the engine 12 is kept at rest. It is noted that the "P-motor" indicated in FIG. 10 is the P-lock drive motor 68.

At a point of time t1 indicated in FIG. 10, the P-motor supply voltage $V_{MR}$ has been lowered to the above-indicated relay switching voltage (e.g., 6.6V). After this point of time t1, therefore, the above-described P-motor power source relay cuts off a power supply to the P-lock drive motor 68, so that the P-lock drive motor 68 is inoperable.

The P-motor supply voltage $V_{MR}$ is further lowered after the point of time t1, and an instantaneous power removal due to a noise, for instance, causes a drop of the P-motor supply voltage $V_{MR}$ at a point between points of time t2 and t3, below an ECU stop voltage (e.g., 5.8V) which is the lowest voltage value above which the P-ECU 106 can be placed in the power-on state. As a result, the P-ECU 106 is temporarily placed in the power-off state (ECU stop state) between the points of time t2 and t3. After the point of time t3, the P-motor supply voltage $V_{MR}$ is raised above the above-indicated ECU stop voltage, so that the P-ECU 106 is restored to its power-on state.

At a point of time t4 after the P-ECU 106 is switched from the power-off state back to the power-on state, the P-motor supply voltage $V_{MR}$ is higher than a diagnostic voltage (e.g., 6.0V) for diagnosis of the P-lock drive motor 68 which is set higher than the above-indicated ECU stop voltage and lower than the above-indicated relay switching value, so that the P-ECU 106 implements a diagnosis of the P-lock drive motor 68, namely, determines whether the P-lock drive motor 68 is operable or not. In the example of FIG. 10, after the point of time t4 the P-motor supply voltage $V_{MR}$ is kept below the above-indicated relay switching voltage value, and the P-lock drive motor 68 is not operable, so that the P-ECU 106 determines that the P-lock drive motor 68 fails to operate. Namely, if the P-motor supply voltage $V_{MR}$ after the P-ECU 106 is switched from the power-off state to the power-on state is held in a range (indicated by a hatched area A01 in FIG. 10) between the above-indicated diagnostic voltage and the above-indicated relay switching voltage value, the P-ECU 106 determines that the P-lock drive motor 68 is not operable due to the drop of the P-motor supply voltage $V_{MR}$, even in the absence of a hardware defect of the P-lock drive motor 68.

Where the P-lock drive motor 68 is not operable due to the drop of the P-motor supply voltage $V_{MR}$, as described above, the P-lock drive motor 68 may be made operable with a rise of the P-motor supply voltage $V_{MR}$, as a result of external charging of the battery. In the present embodiment, the P-ECU 106 can be switched to the READY-ON state if the P-motor supply voltage $V_{MR}$ is raised after the P-ECU 106 once determines that the P-lock drive motor 68 is not operable. Major control functions of the P-ECU 106 will be described.

Figure 11:
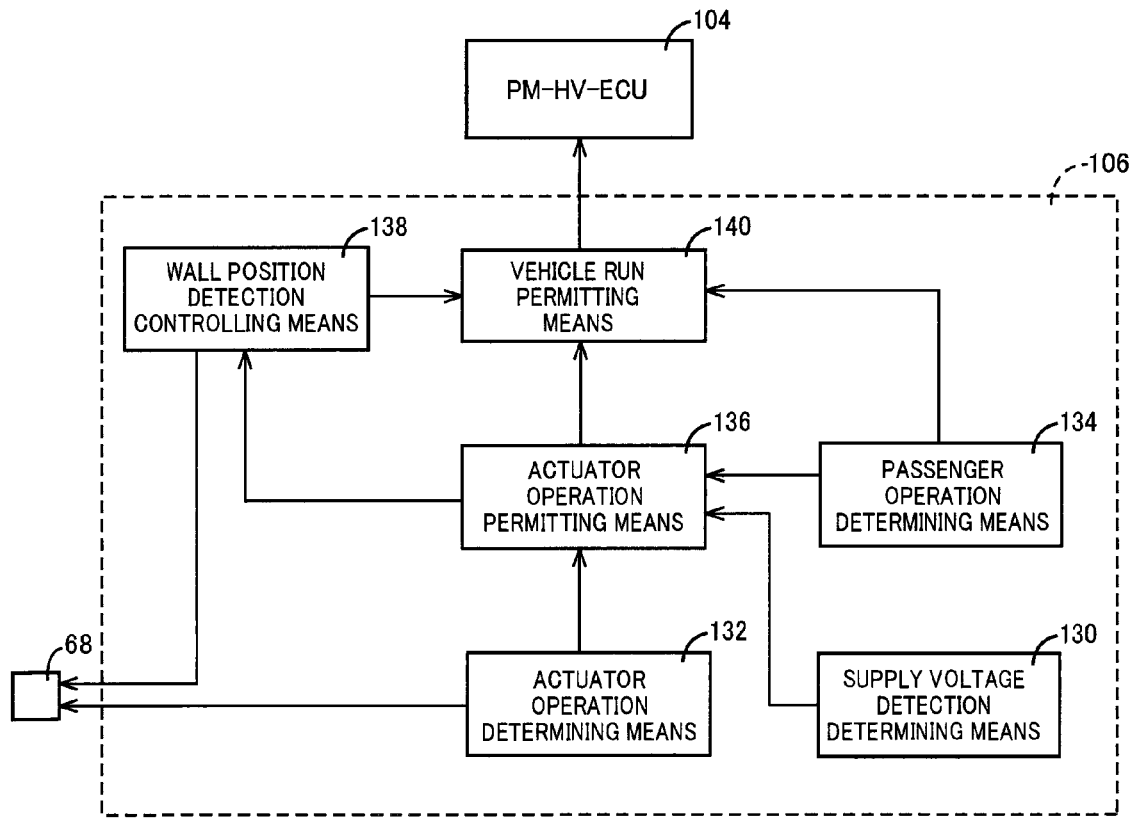
FIG. 11 is a functional block diagram showing major control functions of the shift control apparatus (P-ECU) of FIG. 1.

FIG. 11 is the functional block diagram showing the major functions of the P-ECU 106. As shown in FIG. 11, the P-ECU 106 is provide with supply voltage detection determining means 130, actuator operation determining means 132, passenger operation determining means 134, actuator operation permitting means 136, wall position detection controlling means 138 and vehicle run permitting means 140.

The supply voltage detection determining means 130 is configured to detect the P-motor supply voltage $V_{MR}$ from time to time after the P-ECU 106 is switched from the power-off state to the power-on state. The supply voltage detection determining means 130 determines whether the detected P-motor supply voltage $V_{MR}$ is equal to or higher than a predetermined threshold supply voltage value $V1_{MR}$, in other words, whether the P-motor supply voltage $V_{MR}$ is lower than the threshold supply voltage value $V1_{MR}$. The threshold supply voltage value $V1_{MR}$ is a lower limit of the P-motor supply voltage $V_{MR}$, which may be, for instance, a guaranteed lower limit voltage value (e.g., 8V) which is higher than the above-indicated relay switching value and above which a normal operation of the P-lock drive motor 68 is guaranteed.

When the P-motor supply voltage $V_{MR}$ is lower than the above-indicated threshold supply voltage value $V1_{MR}$, for example, the supply voltage detection determining means 130 determines that the P-motor supply voltage $V_{MR}$ is lower than the above-indicated threshold supply voltage value $V1_{MR}$. If the P-motor supply voltage $V_{MR}$ is raised from a value lower than the above-indicated threshold supply voltage value $V1_{MR}$, to a value not lower than threshold supply voltage value $V1_{MR}$, the supply voltage detection determining means 130 determines that the P-motor supply voltage $V_{MR}$ is raised from the value lower than the above-indicated threshold supply voltage value $V1_{MR}$, to the value not lower than threshold supply voltage value $V1_{MR}$.

The actuator operation determining means 132 is configured to perform a failure diagnosis to determine whether the P-lock drive motor 68 is operable or not. Described more specifically, the actuator operation determining means 132 performs the above-described failure diagnosis in the STATE C indicated in FIG. 6, for example, when the P-ECU 106 is switched from the power-off state to the power-on state. The actuator operation determining means 132 performs the above-described failure diagnosis also when the P-motor supply voltage $V_{MR}$ is raised from a value lower than the above-described threshold supply voltage value $V1_{MR}$, to a value not lower than the threshold supply voltage value $V1_{MR}$, after the determination that the P-lock drive motor 68 is inoperable is obtained in the above-described failure diagnosis. The determination as to whether the P-motor supply voltage $V_{MR}$ is raised from the value lower than the above-described threshold supply voltage value $V1_{MR}$ to the value not lower than the threshold supply voltage value $V1_{MR}$ is made by the above-described supply voltage detection determining means 130. To perform the above-described failure diagnosis, the actuator operation determining means 132 commands the P-lock drive motor 68 to be operated by a predetermined angle in the directions indicated by the arrows C and D in FIG. 3, and determines that the P-lock drive motor 68 is not operable, if a pulse signal is not generated by the encoder 70 while the P-lock drive motor 68 is commanded to be operated in both of the above-indicated directions. The determination as to whether the P-lock drive motor 68 is operable may be made by any other method or by using a sensor, for instance.

The passenger operation determining means 134 is configured to determine whether a predetermined manual operation has been performed by a vehicle passenger. Described more specifically, the predetermined manual operation is an operation to enable the vehicle 10 to be ready for running, that is, an operation (hereinafter referred to as a "vehicle run permitting operation") to switch the power supply state of the vehicle 10 to the above-described vehicle-run-ready state (READY-ON state). Information as to whether this operation has been performed is obtained from the PM-HV-ECU 104.

The actuator operation permitting means 136 is configured to permit an operation of the P-lock drive motor 68 when the actuator operation determining means 132 obtains, in the above-described failure diagnosis, the determination that the P-lock drive motor 68 is operable. This permission makes it possible to operate the P-lock drive motor 68. When the actuator operation determining means 132 obtains, in the above-described failure diagnosis, the determination that the P-lock drive motor 68 is not operable, on the other hand, the actuator operation permitting means 136 inhibits an operation of the P-lock drive motor 68. This inhibition makes it impossible to operate the P-lock drive motor 68.

The actuator operation permitting means 136 may permit an operation of the P-lock drive motor 68 even when the actuator operation determining means 132 obtains in the above-described failure diagnosis the determination that the P-lock drive motor 68 is not operable. Described more specifically, the actuator operation permitting means 136 permits an operation of the P-lock drive motor 68 when the P-motor supply voltage $V_{MR}$ is raised from a value lower than the threshold supply voltage value $V1_{MR}$ to a value not lower than the threshold supply voltage value $V1_{MR}$, after the actuator operation determining means 132 obtains in the above-described failure diagnosis the determination that the P-lock drive motor 68 is not operable. In this case, the actuator operation permitting means 136 permits the operation of the P-lock chive motor 68 after the inhibition of the operation, that is, the actuator operation permitting means 136 first cancels the inhibition and then gives the permission to avoid being complicated.

As described above, the actuator operation permitting means 136 permits the operation of the P-lock drive motor 68 if the P-motor supply voltage $V_{MR}$ is raised from the value lower than the threshold supply voltage value $V1_{MR}$ to the value not lower than the threshold supply voltage value $V1_{MR}$, after the actuator operation determining means 132 obtains in the failure diagnosis the determination that the P-lock drive motor 68 is not operable. However, an additional condition may be used by the actuator operation permitting means 136 to permit the operation. For instance, the actuator operation permitting means 136 may permit the operation of the P-lock drive motor 68 only if the actuator operation determining means 132 obtains the determination that the P-lock drive motor 68 is operable, on the basis of the failure diagnosis performed after the P-motor supply voltage $V_{MR}$ is raised from the value lower than the threshold supply voltage value $V1_{MR}$ to the value not lower than the threshold supply voltage value $V1_{MR}$. The actuator operation permitting means 136 may permit the operation of the P-lock drive motor 68 under an additional condition that the above-indicated vehicle run permitting operation has been performed, after the P-motor supply voltage $V_{MR}$ is raised from the value lower than the threshold supply voltage value $V1_{MR}$ to the value not lower than the threshold supply voltage value $V1_{MR}$. The actuator operation permitting means 136 may permit the operation of the P-lock drive motor 68 under a condition of combination of the above-described conditions. The determination as to whether the P-motor supply voltage $V_{MR}$ is raised from the value lower than the threshold supply voltage value $V1_{MR}$ to the value not lower than the threshold supply voltage value $V1_{MR}$ is made by the above-described supply voltage detection determining means 130, and the determination as to whether the above-indicated vehicle run permitting operation has been performed is made by the above-described passenger operation determining means 134.

The wall position detection controlling means 138 is configured to implement the above-described P-wall position detecting control and non-P-wall position detecting control, for detecting the above-indicated P-wall position and non-P-wall position, when the actuator operation permitting means 136 permits an operation of the P-lock drive motor 68 after the P-ECU 106 is switched from the power-off state to the power-on state. When the actuator operation permitting means 136 inhibits an operation of the P-lock drive motor 68, on the other hand, the wall position detection controlling means 138 does not implement the above-described P-wall position detecting control and non-P-wall position detecting control.

The vehicle run permitting means 140 is configured to permit the PM-HV-ECU 104 to switch the power supply state of the vehicle 10 to the above-indicated vehicle-run-ready state (READY-ON state), after the wall position detection controlling means 138 has detected the above-indicated P-wall position and non-P-wall position. With this permission given by the vehicle run permitting means 140, the PM-HV-ECU 104 switches the power supply state of the vehicle 10 to the above-indicated vehicle-run-ready state (READY-ON state) when the above-described vehicle run permitting operation is performed or if the vehicle run permitting operation has been performed. Namely, the power supply state of the vehicle 10 is switched to the above-indicated vehicle-run-ready state (READY-ON state) when the above-indicated vehicle run permitting operation has been performed after the actuator operation permitting means 136 permits an operation of the P-lock drive motor 68.

When the actuator operation permitting means 136 inhibits an operation of the P-lock drive motor 68, on the other hand, the vehicle run permitting means 140 does not permit the PM-HV-ECU 104 to switch the power supply state of the vehicle 10 to the above-indicated vehicle-run-ready state (READY-ON state). Without the permission given by the vehicle running permitting means 140, the PM-HV-ECU 104 does not switch the power supply state of the vehicle 10 to the above-indicated vehicle-run-ready state (READY-ON state). If the above-indicated vehicle run permitting operation has been performed, the PM-HV-ECU 104 switches the power supply state to the above-indicated power-on state (IG-ON state) rather than the above-indicated vehicle-run-ready state (READY-ON state).

Figure 12:
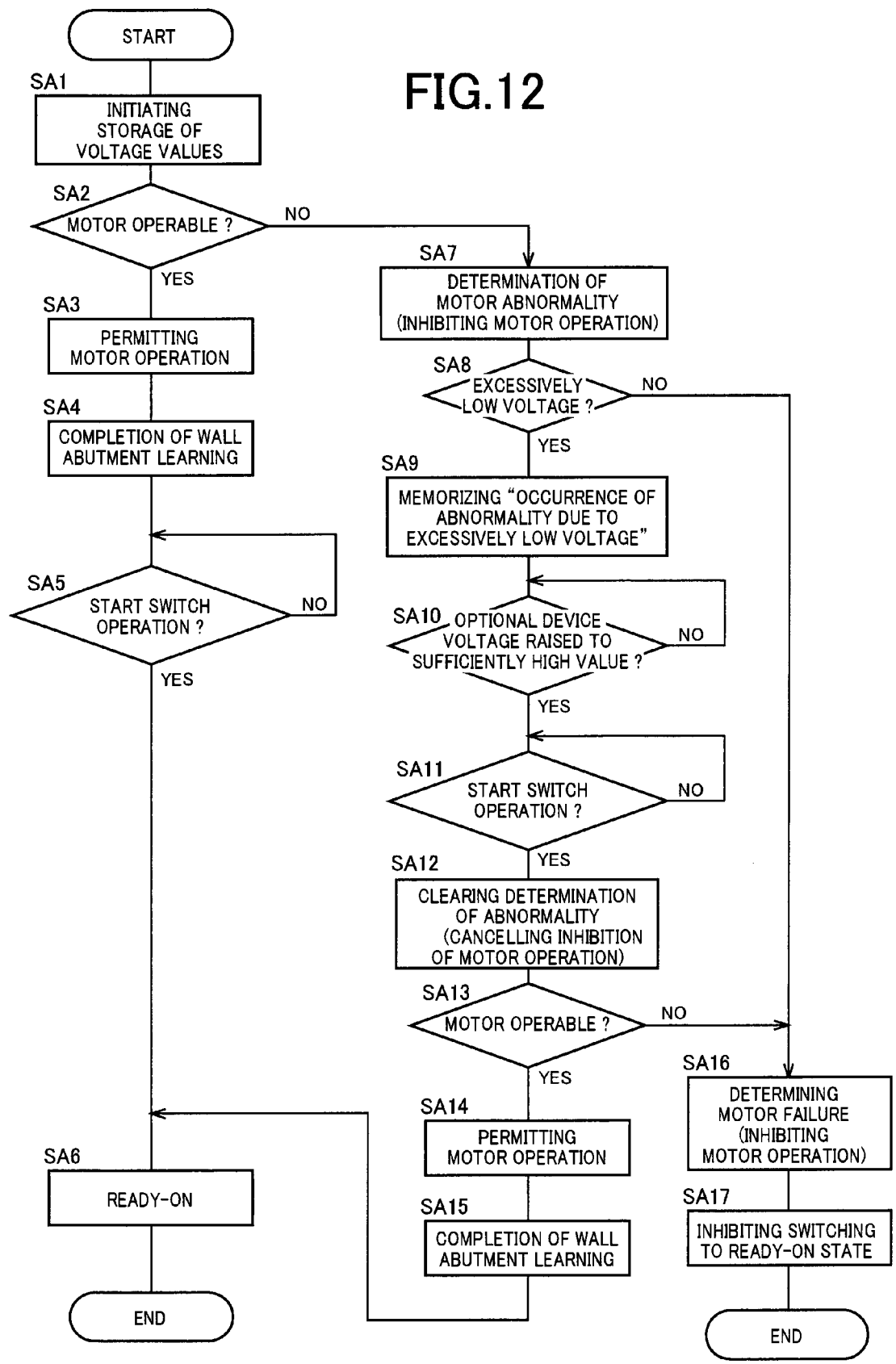
FIG. 12 is a flow chart illustrating a major control operation of the P-ECU of FIG. 11, that is, a control operation to inhibit and permit an operation of the P-lock drive motor.
Figure 13:
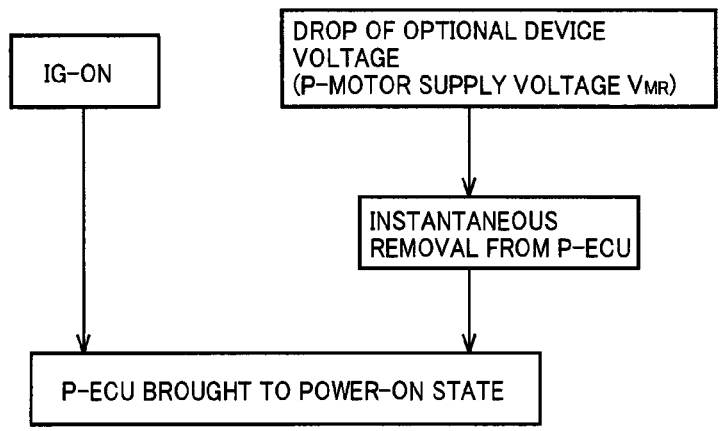
FIG. 13 is a view illustrating a manner in which the P-ECU of FIG. 11 is switched to its power-on state.

FIG. 12 is the flow chart illustrating a major control operation of the P-ECU 106 of the present embodiment, that is, a control operation to inhibit and permit an operation of the P-lock drive motor 68. This control operation is performed alone, or concurrently with other control operations, when the P-ECU 106 is switched from the power-off state to the power-on state. For example, the P-ECU 106 is switched from the power-off state to the power-on state, when the power supply state of the vehicle 10 is switched from the ALL-OFF state or ACC-ON state to the IG-ON state by operating the vehicle power switch 40, or when the P-motor supply voltage $V_{MR}$ is raised to a value not lower than the above-indicated ECU stop voltage (indicated in the time chart of FIG. 10) after instantaneous power removal from the P-ECU 106 due to a noise while the P-motor supply voltage $V_{MR}$ is lower than the ECU stop voltage, as illustrated in FIG. 13. The "optional device voltage" indicated in FIG. 13 is a voltage applied to optional devices such as an air conditioner and the audio device 64. In the present embodiment, the optional device voltage is equal to the above-indicated battery voltage, and is therefore equal to the above-indicated P-motor supply voltage $V_{MR}$.

When the P-ECU 106 is switched from the power-off state to the power-on state, step SA1 (hereinafter "step" being omitted) of the control operation in FIG. 12 is implemented. In SA1, the P-motor supply voltage $V_{MR}$ is detected and stored from time to time. Namely, an operation to detect and store the P-motor supply voltage $V_{MR}$ is initiated in SA1, and continued during implementation of the following steps. SA1 is followed by SA2. SA1 corresponds to the supply voltage detection determining means 130.

SA2 is provided to perform the above-described failure diagnosis as to whether the P-lock drive motor 68 is operable. If an affirmative determination is obtained in SA2, that is, if the P-lock drive motor 68 is operable, the control flow goes to SA3. If a negative determination is obtained in SA2, the control flow goes to SA7. SA2 corresponds the actuator operation determining means 132.

SA3 is provided to permit an operation of the P-lock drive motor 68. SA3 is followed by SA4. SA3 corresponds to the actuator operation permitting means 136.

SA4 is provided to implement the above-described P-wall position detecting control and the above-described non-P-wall position detecting control, for detecting the above-indicated P-wall position and the above-indicated non-P-wall position. After the detection of the above-indicated P-wall position and non-P-wall positions (wall abutment learning) is completed, the control flow goes to SA5. SA4 corresponds to the wall position detection controlling means 138.

SA5 is provided to determine whether the operation to switch the power supply state of the vehicle 10 to the READY-ON state (vehicle run permitting operation) has been performed by the vehicle passenger, that is, a start switch has been operated by the passenger. An affirmative determination in SA5 is made also when the above-indicated start switch is operated upon switching of the P-ECU 106 to its power-on state. The control flow goes to SA6 when the affirmative determination is made in SA5, i.e., the start switch is operated. SA5 corresponds to the passenger operation determining means 134.

SA6 is provided to permit the PM-HV-ECU 104 to switch the power supply state of the vehicle 10 to the above-described vehicle-run-ready state (READY-ON state). According to this permission, the PM-HV-ECU 104 switches the above-indicated power supply state to the above-described vehicle-run-ready state (READY-ON state). SA6 corresponds to the vehicle run permitting means 140.

SA7 is provided to determine that the P-lock drive motor 68 is in an abnormal state (fails to operate), and inhibit the operation of the P-lock drive motor 68. SA7 corresponds to the actuator operation permitting means 136. SA7 is followed by SA8.

SA8 is provided to determine whether the P-motor supply voltage $V_{MR}$ is excessively low, more specifically, whether the P-motor supply voltage $V_{MR}$ is lower than the above-indicated threshold supply voltage value $V1_{MR}$. If an affirmative determination is obtained in SA8, that is, if the P-motor supply voltage $V_{MR}$ is lower than the above-indicated threshold supply voltage value $V1_{MR}$, the P-lock drive motor 68 which was determined in SA2 to become inoperable is considered to become inoperable due to an excessive drop of the P-motor supply voltage $V_{MR}$. In this case, the control flow goes to SA9. If a negative determination is obtained in SA8, the inoperable state is not considered to be caused by the above-indicated P-motor supply voltage $V_{MR}$, but is considered to be caused by a hardware defect of the P-lock drive motor 68 per se. In this case, the control flow goes to SA16. SA8 corresponds to the supply voltage detection determining means 130.

SA9 is provided to memorize "an occurrence of abnormality (a failure) of the P-lock drive motor 68 due to an excessive low supply voltage". SA9 is followed by SA10.

SA10 is provided to determine whether the P-motor supply voltage $V_{MR}$ (=optional device voltage) is raised to a value not lower than the threshold supply voltage value $V1_{MR}$. If the P-motor supply voltage $V_{MR}$ (=optional device voltage) is raised to a value not lower than the threshold supply voltage value $V1_{MR}$, the control flow goes to SA11. SA10 corresponds to the supply voltage detection determining means 130.

SA11 is provided to determine whether the above-indicated start switch has been operated (the vehicle run permitting operation has been performed) by the vehicle passenger after the affirmative determination is obtained in SA10, that is, after the P-motor supply voltage $V_{MR}$ is raised to a value not lower than the threshold supply voltage value $V1_{MR}$. If an affirmative determination is obtained in SA11, that is, if the above-indicated start switch has been operated after the affirmative determination is obtained in SA10, the control flow goes to SA12. SA11 corresponds to the passenger operation determining means 134.

SA12 is provided to cancel (clear) the determination of abnormality of the P-lock drive motor 68 in SA7, and to cancel the inhibition of an operation of the P-lock drive motor 68. SA12 corresponds to the actuator operation permitting means 136. SA12 is followed by SA13.

SA13 is provided to perform the above-described failure diagnosis as to whether the P-lock drive motor 68 is operable. Since the failure diagnosis was once performed in SA2, the failure diagnosis in SA13 is the second failure diagnosis. If an affirmative determination is obtained in SA13, that is, if the P-lock drive motor 68 is operable, the control flow goes to SA14. If a negative determination is obtained in SA13, the control flow goes to SA16. SA13 corresponds to the actuator operation determining means 132.

SA14 is provided to permit an operation of the P-lock drive motor 68. SA14 is followed by SA15. SA14 corresponds to the actuator operation permitting means 136.

SA15 is provided to implement the above-described P-wall position detecting control and the above-described non-P-wall position detecting control, for detecting the above-indicated P-wall position and the above-indicated non-P-wall position. After the detection of the above-indicated P-wall position and non-P-wall positions (wall abutment learning) is completed, the control flow goes to SA6. SA15 corresponds to the wall position detection controlling means 138.

SA16 is provided to determine that the P-lock drive motor 68 per se suffers from a hardware defect, that is, fails to operate, and to inhibit an operation of the P-lock drive motor 68, or maintain the inhibition of the operation if the operation has already been inhibited. SA16 corresponds to the actuator operation permitting means 136. SA16 is followed by SA17.

[0101] SA17 is provided to inhibit the PM-HV-ECU 104 to switch the power supply state of the vehicle 10 to the above-described vehicle-run-ready state (READY-ON state). According to this inhibition, the PM-HV-ECU 104 does not switch the power supply state of the vehicle 10 to the vehicle-run-ready state (READY-ON state). For instance, the PM-HV-ECU 104 maintains the power-on state (IG-ON state). SA17 corresponds to the vehicle run permitting means 140.

Figure 14:
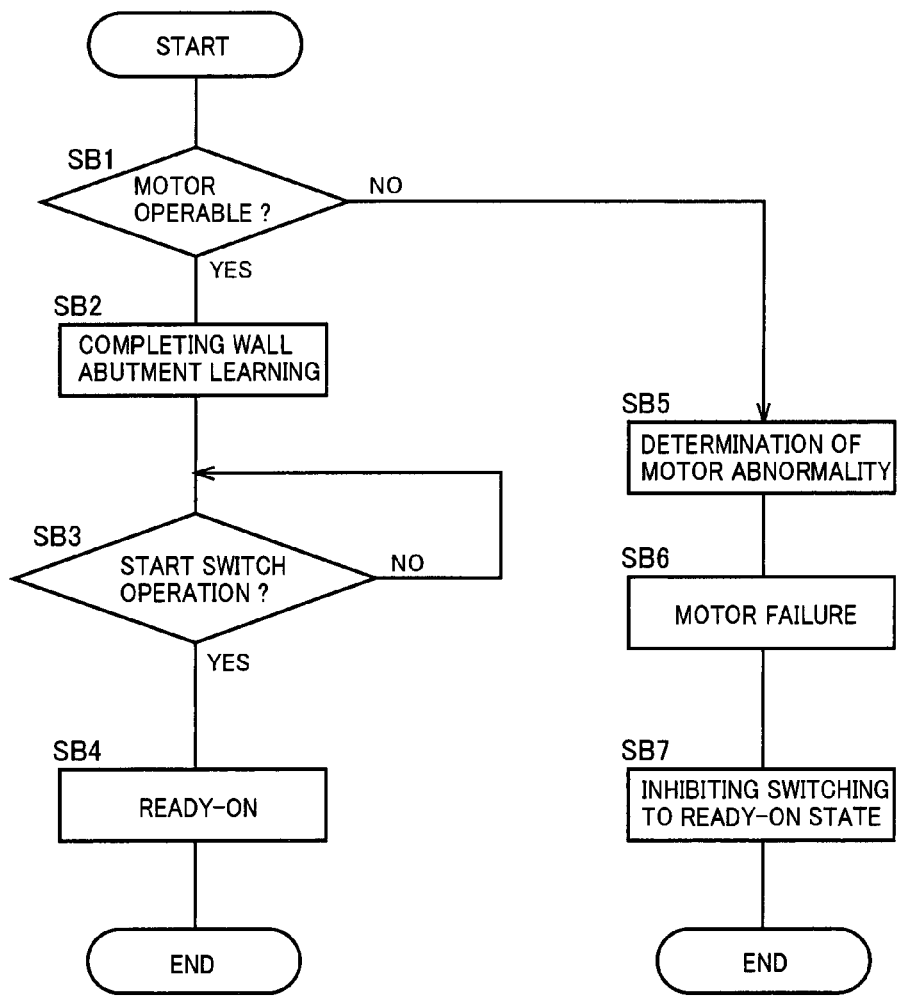
FIG. 14 is a flow chart illustrating a major control operation of a prior art P-ECU, for comparison with that illustrated in the flow chart of FIG. 12.

FIG. 14 is the flow chart illustrating a major control operation of a prior art P-ECU, for comparison with that illustrated in the flow chart of FIG. 12. Like the control operation of the flow chart of FIG. 12, the control operation of this flow chart is performed when the P-ECU is switched from the power-off state to the power-on state, as illustrated in FIG. 13.

In SB1 of FIG. 14, the determination is made as to whether the P-lock drive motor 68 is operable. If the P-lock drive motor 68 is operable, SB2-SB4 are implemented. If the P-lock drive motor 68 is not operable, SB5-SB7 are implemented.

SB2 is provided to implement the wall abutment learning, as in SA4 of FIG. 12. After the wall abutment learning is completed, SB3 is implemented to make the determination as to whether the above-indicated start switch has been operated, as in SA5 of FIG. 12. If an affirmative determination is obtained in SB3, SB4 is implemented to permit the PM-HV-ECU 104 to switch the power supply state of the vehicle 10 to the READY-ON state. According to this permission, the PM-HV-ECU 104 switches the power supply state to the READY-ON state.

On the other hand, SB5 is provided to determine that the P-lock drive motor 68 is abnormal (fails to operate), as in SA7 of FIG. 12. Then, the control flow goes to SB6 to determine that the motor failure takes place, as in SA16 of FIG. 12. Then, the control flow goes to SB7 to inhibit the PM-HV-ECU 104 to switch the power supply state of the vehicle 10 to the READY-ON state. According to this inhibition, the PM-HV-ECU 104 does not switch the power supply state of the vehicle 10 to the READY-ON state, even when the above-indicated start switch is operated. For example, the PM-HV-ECU 104 maintains the IG-ON state.

As described above, the prior art control operation illustrated in FIG. 14 has a problem that once the P-lock drive motor 68 is determined to be inoperable, the power supply state of the vehicle 10 cannot be switched to the READY-ON state even after the P-lock drive motor 68 becomes operable again as a result of a rise of the P-motor supply voltage $V_{MR}$ to a sufficiently high value, unless the P-ECU is switched back to the power-on state. The control operation according to the present embodiment illustrated in FIG. 12 does not suffer from the prior art problem described above.

The present embodiment is configured such that the actuator operation determining means 132 performs the failure diagnosis as to whether the P-lock drive motor (actuator) 68 is operable or not, and the actuator operation permitting means 136 permits an operation of the P-lock drive motor 68 if the P-motor supply voltage $V_{MR}$ is raised from a value lower than the above-indicated threshold supply voltage value $V1_{MR}$ to a value not lower than the threshold supply voltage value $V1_{MR}$ after the actuator operation determining means 132 obtains, in the failure diagnosis, the determination that the P-lock drive motor 68 is inoperable. If the P-motor supply voltage $V_{MR}$ is raised from the value lower than the above-indicated threshold supply voltage value $V1_{MR}$ to the value not lower than the threshold supply voltage value $V1_{MR}$, the P-lock drive motor 68 which was determined to be inoperable prior to this rise of the P-motor supply voltage $V_{MR}$ is considered to become inoperable due to an excessive drop of the P-motor supply voltage $V_{MR}$. Further, the P-lock drive motor 68 is considered to be operable after the rise of the P-motor supply voltage $V_{MR}$. Accordingly, an adequate control processing can be performed with respect to the P-lock drive motor 68, in consideration of a possibility that the P-lock drive motor 68 becomes operable, more specifically, a possibility that the P-motor supply voltage $V_{MR}$ is raised to a sufficiently high value, after the previous determination that the P-lock drive motor 68 is inoperable. The adequate control processing reduces a loss of a vehicle operating comfort felt by the vehicle operator. For example, the adequate control processing is a normal control of the P-lock drive motor 68 to be implemented where the P-lock drive motor 68 is normally operable. On the other hand, an inadequate control processing with respect to the P-lock drive motor 68 may be a control of the P-lock drive motor 68 to be implemented in the event of a failure of the P-lock drive motor 68, for instance, a control to inhibit an operation of the P-lock drive motor 68, based on an incorrect recognition that the P-lock drive motor 68 is inoperable, while in fact the P-lock drive motor 68 is operable.

The present embodiment is further configured such that the threshold supply voltage value $V1_{MR}$ is a lower limit of the P-motor supply voltage $V_{MR}$, so that it is possible to more adequately determine that the P-lock drive motor 68 which was determined to be inoperable become inoperable due to an excessive drop of the P-motor supply voltage $V_{MR}$.

The present embodiment is also configured such that the actuator operation determining means 132 performs the above-described failure diagnosis as a second failure diagnosis if the P-motor supply voltage $V_{MR}$ is raised from the value lower than the above-described threshold supply voltage value $V1_{MR}$ to the value not lower than the threshold supply voltage value $V1_{MR}$ after the determination that the P-lock drive motor 68 is inoperable is obtained in the first failure diagnosis, and such that the actuator operation permitting means 136 may permit the operation of the P-lock drive motor 68 only if the actuator operation determining means 132 obtains in the second failure diagnosis the determination that the above-described P-lock drive motor 68 is operable. Accordingly, it is possible to permit the operation of the P-lock drive motor 68 after it is confirmed that the P-lock drive motor 68 becomes operable as a result of the rise of the P-motor supply voltage $V_{MR}$ to the value not lower than the threshold supply voltage value $V1_{MR}$.

The present embodiment is further configured such that the actuator operation permitting means 136 permits the operation of the P-lock drive motor 68 under a condition that the above-described vehicle run permitting operation has been performed by the vehicle passenger after the rise of the P-motor supply voltage $V_{MR}$ from the value lower than the threshold supply voltage value $V1_{MR}$ to the value not lower than the threshold supply voltage value $V1_{MR}$ after the actuator operation determining means 132 obtains in the above-described failure diagnosis the determination that the P-lock drive motor 68 is inoperable. Accordingly, the P-lock drive motor 68 is operated after the operation by the vehicle passenger, preventing a discomfort that would otherwise be felt by the vehicle passenger upon operation of the P-lock drive motor 68 while the vehicle passenger recognizes that the P-lock drive motor 68 is inoperable.

In the present embodiment, the predetermined manual operation by the vehicle passenger detected by the passenger operation determining means 134 is the operation (vehicle run permitting operation) to switch the power supply state of the vehicle 10 to the above-indicated vehicle-run-ready state (READY-ON state). The detection of the vehicle run permitting operation has an advantage that the vehicle passenger is not required to perform a special operation to permit the operation of the P-lock drive motor 68, since the vehicle run permitting operation is an operation required to start running of the vehicle.

The present embodiment is also configured such that the actuator operation permitting means 136 inhibits the operation of the P-lock drive motor 68 if the actuator operation determining means 132 obtains in the above-described failure diagnosis the determination that the P-lock drive motor 68 is inoperable. The actuator operation permitting means 136 cancels an inhibition of the operation of the P-lock drive motor 68, before permitting the operation of the P-lock drive motor 68 after the inhibition. Accordingly, it is possible to avoid a complicated control of permitting and inhibiting the operation of the P-lock drive motor 68.

The present embodiment is also configured to implement SA8 of FIG. 12 for making the determination as to whether the P-motor supply voltage $V_{MR}$ is excessively low, after the determination in SA2 that the P-lock drive motor 68 is inoperable, so that it is possible to correctly determine whether the inoperable state of the P-lock drive motor 68 determined in SA2 is caused by an excessive drop of the P-motor supply voltage $V_{MR}$ or a hardware defect of the P-lock drive motor 68 per se.

The present embodiment is further configured to implement SA13 of FIG. 12 for making the second failure diagnosis after the determination in SA10 that the P-motor supply voltage $V_{MR}$ is raised to a value not lower than the threshold supply voltage value $V1_{MR}$, so that the load of the P-lock drive motor 68, etc. is reduced, as compared with the load where the failure diagnosis is performed at a regular interval irrespective of the P-motor supply voltage $V_{MR}$, for determining whether the P-lock drive motor 68 is operable or not.

The present embodiment is also configured to use the same value $V1_{MR}$ as the threshold for diagnosing the P-motor supply voltage $V_{MR}$ in both of SA8 and SA10 of FIG. 12, eliminating a need for setting different threshold values to be used in the respective two steps.

While the embodiment of this invention has been described in detail by reference to the drawings, it is to be understood that the invention may be otherwise embodied.

For example, the battery for supplying an electric energy to the P-lock drive motor 68 in the illustrated embodiment may be provided in the electric-energy storage device 46, or provided as an electric power source separate from the electric-energy storage device 46 in the vehicle 10.

While the threshold supply voltage value $V1_{MR}$ used in the illustrated embodiment is set to be the above-indicated guaranteed lower limit voltage value of the P-lock drive motor 68, the threshold supply voltage value $V1_{MR}$ may be set otherwise. For instance, the threshold supply voltage value $V1_{MR}$ may be set to be the above-indicated relay switching voltage value which is a lower limit when electric power is supplied to the P-lock drive motor 68, above which the P-lock drive motor 68 is operable.

Although the predetermined manual operation by the vehicle passenger which is detected by the passenger operation determining means 134 in the illustrated embodiment is the above-indicated vehicle run permitting operation, the predetermined manual operation is not limited to this vehicle run permitting operation, and may be other manual operations performed by the vehicle passenger.

In the illustrated embodiment, the PM-HV-ECU 104 switches the power supply state of the vehicle 10 to the READY-ON state from any other state, when the PM-HV-ECU 104 receives the above-described power switch signal in the brake-on state $B_{ON}$ while the P position is established. However, the power supply state may be switched to the READY-ON state when another operation by the vehicle passenger other than the operation performed to generate the power switch signal is performed, or when such another operation is performed concurrently with the operation to generate the power switch signal.

Although SA11 is implemented prior to SA14 in the flow chart of FIG. 12 in the illustrated embodiment, the flow chart may be modified such that SA11 is not implemented prior to SA14, but is implemented between SA14 and SA6.

In the illustrated embodiment, the flow chart of FIG. 12 includes SA13. However, the flow chart may be modified so as to eliminate SA13 so that SA12 is followed by SA14.

In the illustrated embodiment, the flow chart of FIG. 12 includes SA9. However, SA9 may be eliminated.

In the illustrated embodiment, the actuator operation determining means 132 is configured to perform the failure diagnosis when the P-ECU 106 is switched from the power-off state to the power-on state, for instance. However, the failure diagnosis may be performed in other cases, for example, when the PM-HV-ECU 104 or P-ECU 106 detects any failure. Alternatively, the failure diagnosis may be performed at a predetermined time interval.

It is to be understood that the foregoing embodiment and modifications have been described for illustrative purpose only, and that the present invention may be embodied with various other changes and improvements which may occur to those skilled in the art.

NOMENCLATURE OF REFERENCE SIGNS

10: Vehicle
14: Drive wheels (Vehicle wheels)
16: Parking lock device
68: P-lock drive motor (Actuator)
106: P-ECU (Vehicular shift control apparatus)

The invention claimed is:

1. A vehicular shift control apparatus for a vehicle provided with a parking lock device selectively switched to a locking position in which rotation of wheels of the vehicle is prevented and a non-locking position in which the rotation of said wheels is not prevented, by an operation of an electrically operated actuator, the vehicular shift control apparatus being configured to perform a failure diagnosis to determine whether said actuator is operable or not, said vehicular shift control apparatus comprising:

said vehicular shift control apparatus permits the operation of said actuator if a supply voltage to said actuator is raised from a value lower than a predetermined threshold supply voltage value to a value not lower than said threshold supply voltage value after a determination that said actuator is inoperable is obtained in said failure diagnosis.

2. The vehicular shift control apparatus according to claim 1 wherein said threshold supply voltage value is a lower limit of the supply voltage to said actuator.

3. The vehicular shift control apparatus according to claim 1, wherein the vehicular shift control apparatus performs said failure diagnosis as a second failure diagnosis if the supply voltage to said actuator is raised from the value lower than said predetermined threshold supply voltage value to the value not lower than said threshold supply voltage value after the determination that said actuator is inoperable is obtained in the first failure diagnosis, and permits the operation of said actuator only if the determination that said actuator is operable is obtained in said second failure diagnosis.

4. The vehicular shift control apparatus according to claim 1, wherein the vehicular shift control apparatus permits the operation of said actuator under a condition that a predetermined manual operation has been performed by a vehicle passenger after a rise of said supply voltage to said actuator from the value lower than said predetermined threshold supply voltage value to the value not lower than said threshold supply voltage value, if the rise of said supply voltage to the value not lower than threshold supply voltage value occurs after the determination that said actuator is inoperable is obtained in said failure diagnosis.

5. The vehicular shift control apparatus according to claim 4, wherein said predetermined manual operation by the vehicle passenger is an operation that enables said vehicle to be ready for running.

6. The vehicular shift control apparatus according to claim 1, wherein:

said vehicle shift control apparatus inhibits the operation of said actuator if the determination that said actuator is inoperable is obtained in said failure diagnosis; and said vehicle shift control apparatus cancels an inhibition of the operation of said actuator, before permitting the operation of the actuator after the inhibition if said vehicle shift control apparatus permits after the operation of said actuator is inhibited.

* * * * *